(12) United States Patent
Manolakos et al.

(10) Patent No.: US 11,451,428 B2
(45) Date of Patent: Sep. 20, 2022

(54) CONFIGURABLE REFERENCE SIGNAL TIME DIFFERENCE MEASUREMENT (RSTD) SEARCH WINDOW

(71) Applicant: QUALCOMM Incorporated, San Diego, CA (US)

(72) Inventors: Alexandros Manolakos, San Diego, CA (US); Sony Akkarakaran, Poway, CA (US); Sven Fischer, Nuremberg (DE); Guttorm Ringstad Opshaug, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/739,067

(22) Filed: Jan. 9, 2020

(65) Prior Publication Data

US 2020/0228381 A1  Jul. 16, 2020

Related U.S. Application Data

(60) Provisional application No. 62/914,236, filed on Oct. 11, 2019.

(30) Foreign Application Priority Data

Jan. 11, 2019  (GR) .............................. 20190100022

(51) Int. Cl.
*H04L 27/26* (2006.01)
*H04W 64/00* (2009.01)
(Continued)

(52) U.S. Cl.
CPC ........ *H04L 27/2665* (2013.01); *H04L 27/266* (2013.01); *H04L 27/2675* (2013.01);
(Continued)

(58) Field of Classification Search
CPC ....... G01S 5/10; G01S 5/0268; H04L 5/0007; H04L 5/0023
See application file for complete search history.

(56) References Cited

U.S. PATENT DOCUMENTS 6,433,739 B1  8/2002  Soliman
9,684,057 B2  6/2017  Siomina et al.
(Continued)

FOREIGN PATENT DOCUMENTS

WO        2010062606 A1   6/2010
WO   WO-2012008727 A3   4/2012
(Continued)

OTHER PUBLICATIONS

International Search Report and Written Opinion—PCT/US2020/013237—ISA/EPO—dated Apr. 28, 2020.
(Continued)

*Primary Examiner* — Ayaz R Sheikh
*Assistant Examiner* — Debebe A Asefa
(74) *Attorney, Agent, or Firm* — Qualcomm Incorporated

(57) ABSTRACT

Disclosed are methods and apparatuses for providing configurable reference signal timing difference (RSTD) search windows for positioning. In an aspect, an RSTD search window is configured based on a positioning reference signal (PRS) configuration. The RSTD search window is provided to the UE. A plurality of PRS is transmitted from a network entity to a user equipment (UE), each PRS having the PRS configuration. The plurality of PRS are transmitted in a subset that is less than all subcarriers over a given bandwidth.

113 Claims, 16 Drawing Sheets

US 11,451,428 B2

Page 2

(51) Int. Cl.
G01S 13/76 (2006.01)
G01S 5/10 (2006.01)
(52) U.S. Cl.
CPC ............... H04W 64/00 (2013.01); G01S 5/10 (2013.01); G01S 13/76 (2013.01)

(56) References Cited

U.S. PATENT DOCUMENTS

| | | | |
|---|---|---|---|
| 9,736,648 B2 | 8/2017 | Lim et al. | |
| 10,034,191 B2 | 7/2018 | Nguyen et al. | |
| 10,219,238 B2 | 2/2019 | Abdi et al. | |
| 2010/0149962 A1* | 6/2010 | Cho | H04L 5/06 370/210 |
| 2011/0205122 A1* | 8/2011 | Siomina | G01S 5/0221 342/387 |
| 2015/0215884 A1 | 7/2015 | Horvat et al. | |
| 2017/0289831 A1* | 10/2017 | Park | G01S 5/0236 |
| 2017/0289952 A1* | 10/2017 | Muquet | G01S 19/05 |
| 2018/0343132 A1 | 11/2018 | Maheshwari et al. | |
| 2019/0052996 A1 | 2/2019 | Sahai et al. | |
| 2019/0342132 A1* | 11/2019 | Kazmi | H04L 5/001 |
| 2019/0342709 A1* | 11/2019 | Markhovsky | G01S 5/0257 |
| 2021/0243635 A1* | 8/2021 | Yan | H04L 5/0048 |

FOREIGN PATENT DOCUMENTS

| | | |
|---|---|---|
| WO | WO-2015180776 A1 | 12/2015 |
| WO | WO-2017188547 A1 | 11/2017 |
| WO | WO-2018194758 A1 | 10/2018 |
| WO | WO-2018208404 A1 | 11/2018 |
| WO | WO-2019004549 A1 | 1/2019 |

OTHER PUBLICATIONS

Liu J., et al., "Enhanced RSTD for Scalable Bandwidth of OTDOA Positioning in 3GPP LTE," 2013, International Conference on Localization and GNSS (ICL-GNSS). IEEE, Jun. 25, 2013 (Jun. 25, 2013), pp. 1-5, XP032478013, ISSN: 2325-0747, DOI:10.1109/ICL-GNSS.2013.6577277, ISBN: 978-1-4799-0484-6[retrieved on Aug. 8, 2013], the whole document.
3GPP TS 36.331: "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.7.0 (Sep. 2019), pp. 1-959, URL: https://www.3gpp.Org/ftp//Specs/archive/36_series/36.331/36331-f70.zip.
3GPP TS 36.355: "3rd Generation Partnership Project; Technical Specification Group Radio Access Network; Evolved Universal Terrestrial Radio Access (E-UTRA); LTE Positioning Protocol (LPP) (Release 15)", 3GPP TS 36.355 V15.5.0 (Sep. 2019), pp. 1-222, URL: https://www.3gpp.org/ftp//Specs/archive/36_series/36.355/36355-f50.zip.
Ericsson: "Introduction of Positioning for Further Enhanced MTC", R2-1702406, 3GPP TSG-RAN WG2 Meeting #97, Athens, Greece, Feb. 13-17, 2017, 14 Pages, URL: https://www.3gpp.org/ftp/TSG_RAN/WG2_RL2/TSGR2_97/Docs/R2-1702406.zip.
Ericsson: "UE Measurements for OTDOA", R4-1915258, 3GPP TSG-RAN WG4 Meeting #93, Reno, Nevada, USA, Nov. 18 -22, 2019, 7 Pages, URL: https://www.3gpp.org/ftp/tsg_ran/WG4_Radio/TSGR4_93/Docs/R4-1915258.zip.
Ericsson: "RSTD Measurements with Dense PRS Configurations", R2-1807771, 3GPP TSG-RAN2 Meeting #102, Busan, South Korea, May 21-25, 2018, 7 Pages, URL: https://www.3gpp.org/ftp/tsg_ran/WG2_RL2/TSGR2_102/Docs/R2-1807771.zip.
Fischer S., "Observed Time Difference of Arrival (OTDOA) Positioning in 3GPP LTE", Jun. 6, 2014 (Jun. 6, 2014), pp. 1-62, XP055549372, Retrieved from the Internet: URL: https://www.qualcomm.com/media/documents/files/otdoa-positioning-in-3gpp-lte.pdf [retrieved on Jan. 30, 2019] section 7.
Intel Corporation: "Discussion on NR DL PRS RSTD Requirements for UE", R4-1911037, 3GPP TSG-RAN WG4 Meeting #92-Bis, Chongqing, China, Oct. 14-18, 2019, 10 Pages, URL: https://www.3gpp.org/ftp/tsg_ran/WG4_Radio/TSGR4_92Bis/Docs/R4-1911037.zip.
Intel Corporation: "Discussion on NR PRS RSTD Requirements for UE", R4-1913460, 3GPP TSG-RAN WG4 Meeting #93, Reno, USA, Nov. 18-22, 2019, 17 Pages, URL: https://www.3gpp.org/ftp/tsg_ran/WG4_Radio/TSGR4_93/Docs/R4-1913460.zip.
Intel Corporation: "System-Level Evaluations for PRS-RSTD and PRS-RSRP", R4-1913487, 3GPP TSG-RAN WG4 Meeting #93, Reno, US, Nov. 18-22, 2019, , pp. 1-7, URL: https://www.3gpp.org/ftp/tsg_ran/WG4_Radio/TSGR4_93/Docs/R4-1913487.zip.
Mediatek: "Discussion on PRS RSTD Measurement", 3GPP Draft, 3GPP TSG RAN WG4 meeting #93, R4-1913264, 3rd Generation Partnership Project (3GPP), Mobile Competence Centre, 650, Route Des Lucioles, F-06921 Sophia-Antipolis Cedex, France, vol. RAN WG4, No. Reno, Nevada, USA, Nov. 18, 2019-Nov. 22, 2019, Nov. 8, 2019 (Nov. 8, 2019), XP051817886, 7 Pages, Retrieved from the Internet: URL: https://ftp.3gpp.org/tsg_ran/WG4_Radio/TSGR4_93/Docs/R4-1913264.zip. R4-1913264. Discussion on PRS-RSTD Measurement.docx [Retrieved on Nov. 8, 2019] the whole document.
Qualcomm Incorporated: "Addition of TDD UL/DL Configuration to OTDOA Assistance Data", R2-1817896, 3GPP TSG-RAN WG2 Meeting #104, Spokane, USA, Nov. 12-16, 2018, 11 Pages, URL: https://www.3gpp.org/ftp/tsg_ran/WG2_RL2/TSGR2_104/Docs/R2-1817896.zip.
Qualcomm Incorporated, et al., "Support for NPRS Enhancements", R2-1813376, 3GPP TSG-RAN WG2 Meeting #103, Gothenburg, Sweden, Aug. 20-24, 2018, 12 Pages, URL: https://www.3gpp.org/ftp/tsg_ran/WG2_RL2/TSGR2_103/Docs/R2-1813376.zip.
Qualcomm Incorporated: "On DL PRS RSTD Measurements in NR Positioning", 3GPP Draft, 3GPP TSG-RAN WG4 Meeting #92-Bis, R4-1912347—On DL PRS RSTD Measurements in NR Positioning, 3rd Generation Partnership Project (3GPP), Mobile Competence Centre, 650, Route Des Lucioles, F-06921, Sophia-Antipolis Cedex, France, vol. RAN WG4, No. Chongqing, China; Oct. 14, 2019-Oct. 18, 2019, Oct. 4, 2019 (Oct. 4, 2019), XP051807074, 6 pages, Retrieved from the Internet: URL: https://ftp.3gpp.org/tsg_ran/WG4_Radio/TSGR4_92Bis/Docs/R4-1912347.zip R4-1912347—On DL PRS RSTD measurements in NR positioning .docx [retrieved on Oct. 4, 2019] Sections 2-4, 6 and 7.
Qualcomm Incorporated: "On DL PRS RSTD Measurements in NR Positioning", 3GPP Draft, R4-1915178, 3GPP TSG-RAN WG4 Meeting #93, 3rd Generation Partnership Project (3GPP), Mobile Competence Centre, 650, Route Des Lucioles, F-06921 Sophia-Antipolis Cedex, France, vol. RAN WG4, No. Reno, NV, USA, Nov. 18, 2019-Nov. 22, 2019, Nov. 8, 2019 (Nov. 8, 2019), XP051819416, pp. 1-7, Retrieved from the Internet: URL:https://ftp.3gpp.org/tsg_ran/WG4_Radio/TSGR4_93/Docs/R4-1915178.zip, R4-1915178, On DL PRS RSTD measurements in NR Positioning.docx[retrieved on Nov. 8, 2019] Sections 2, 5 and 6.

* cited by examiner

200m ISD, UMI, 28 GHz, 120 KHz, 400 MHz, 13 dB UE Noise figure

| and | Name | Mode | | | Downlink (MHz) | | | Bandwidth DL/UL (MHz) |
|---|---|---|---|---|---|---|---|---|
| | | | | | Start / Middle / End | | | |
| 41 | TD 2600+ | TD | 15 30 | 3 6 | 2496 | 2593 | 2690 | 194 |
| n77 | TD 3700 | TD | 15 30 | 1 2 | 3300 | 3750 | 4200 | 900 |
| n78 | TD 3500 | TD | 15 30 | 1 2 | 3300 | 3550 | 3800 | 500 |
| n79 | TD 4500 | TD | 15 30 | 1 2 | 4400 | 4700 | 5000 | 600 |

*FIG. 11*

NR band overlap

| Band | Name | Mode | Band Overlap | |
|---|---|---|---|---|
| | | | Full (MF81) | Partial |
| FR1 | | | | |
| n1 | 2100 | FD | n84 | n2,n25, n66 |
| n2 | 1900 PCS | FD | n25 | n1,n2, n39, n84 |
| n3 | 1800 | FD | n80, n86 | n2,n25 |
| n5 | 850 | FD | | n8,n20, n81, n82 |
| n7 | 2600 | FD | n41 | |
| n8 | 900 | FD | n81 | n5 |
| n12 | 700 a | FD | | n28,n83 |
| n20 | 800 | FD | n82 | n5,n28 |
| n25 | 1900+ | FD | n2 | n1,n3, n39, n84 |
| n28 | 700 APT | FD | n83 | n12,n20 |
| n34 | TD 2000 | TD | | n70 |
| n38 | TD 2600 | TD | n41 | |
| n39 | TD 1900+ | TD | | n2, n25 |
| n40 | TD 2300 | TD | | |
| n41 | TD 2600+ | TD | n7, n38 | |
| n50 | TD 1500+ | TD | n75 | n74 |
| n51 | TD 1500- | TD | n76 | n74 |
| n66 | AWS-3 | FD | n80, n86 | n3, n80 |
| n70 | AWS-4 | FD | | n34 |
| n71 | 600 | FD | | |
| n74 | L-band | FD | | n50, n75 |
| n75 | DL 1500+ | SD | n50 | n74 |
| n76 | DL 1500- | SD | n51 | n74 |
| n77 | DL 3700 | TD | n78 | |
| n78 | TD 3500 | TD | n77 | |
| n79 | TD 4500 | TD | | |
| n80 | UL 1800 | SU | n3, n66, n85 | |
| n81 | UL 900 | SU | n8 | n5 |
| n82 | UL 800 | SU | n20 | n5 |
| n83 | UL 700 | SU | n28 | n12 |
| n84 | UL 2100 | SU | n1 | n2, n25 |
| n86 | UL AWS | SU | n3, n86, n80 | n3 |
| FR2 | | | | |
| n257 | 28 GHz | TD | n261 | n258 |
| n258 | 26 GHz | TD | | n257 |
| n260 | 39 GHz | TD | | |
| n261 | 28 GHz US | TD | n257 | |

*FIG. 12*

CONFIGURABLE REFERENCE SIGNAL TIME DIFFERENCE MEASUREMENT (RSTD) SEARCH WINDOW

CROSS-REFERENCE TO RELATED APPLICATIONS

The present Application for Patent claims priority under 35 U.S.C. § 119 to Greek Patent Application No. 20190100022, entitled "CONFIGURABLE REFERENCE SIGNAL TIME DIFFERENCE MEASUREMENT (RSTD) SEARCH WINDOW," filed Jan. 11, 2019, and to U.S. Provisional Application No. 62/914,236, entitled "CONFIGURABLE REFERENCE SIGNAL TIME DIFFERENCE MEASUREMENT (RSTD) SEARCH WINDOW," filed Oct. 11, 2019, both of which are assigned to the assignee hereof, and expressly incorporated herein by reference in their entirety.

TECHNICAL FIELD

Various aspects described herein generally relate to wireless communication systems, and more particularly, to configurable reference signal time difference (RSTD) search windows for observed time difference of arrival (OTDOA) and multi-round trip time (RTT) based positioning.

BACKGROUND

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include code division multiple access (CDMA) systems, time division multiple access (TDMA) systems, frequency division multiple access (FDMA) systems, orthogonal frequency division multiple access (OFDMA) systems, and others. These systems are often deployed in conformity with specifications such as Long Term Evolution (LTE) and LTE Advanced (LTE-A) provided by the Third Generation Partnership Project (3GPP), Ultra Mobile Broadband (UMB) and Evolution Data Optimized (EV-DO) provided by the Third Generation Partnership Project 2 (3GPP2), WiFi (also referred to as Wi-Fi) 802.11 provided by the Institute of Electrical and Electronics Engineers (IEEE), etc.

A fifth generation mobile standard (referred to as "5G" or "New Radio" (NR)) will enable higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current LTE standard. Furthermore, signaling efficiencies should be enhanced and latency should be substantially reduced compared to current standards.

To support position estimations in terrestrial wireless networks, a mobile device can be configured to measure and report the OTDOA or RSTD between reference RF signals received from two or more network nodes (e.g., different base stations or different transmission points (e.g., antennas) belonging to the same base station).

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a network entity includes determining a reference signal timing difference (RSTD) search window based on a positioning reference signal (PRS) configuration; providing the RSTD search window to a user equipment (UE); and transmitting a plurality of PRS to the UE, each PRS having the PRS configuration, wherein the plurality of PRS are transmitted in a subset that is less than all subcarriers over a given bandwidth.

In an aspect, a network entity includes a transceiver circuitry; a memory circuitry; and a processor circuitry, wherein the transceiver circuitry, the memory circuitry, and the processor circuitry are configured to: configure an RSTD search window based on a PRS configuration; provide the RSTD search window to a UE; and transmit a plurality of PRS to the UE, each PRS having the PRS configuration, wherein the plurality of PRS are transmitted in a subset that is less than all subcarriers over a given bandwidth.

In an aspect, a network entity includes means for configuring an RSTD search window based on a PRS configuration; means for providing the RSTD search window to a UE; and means for transmitting a plurality of PRS to the UE, each PRS having the PRS configuration, wherein the plurality of PRS are transmitted in a subset that is less than all subcarriers over a given bandwidth.

In an aspect, a non-transitory computer-readable medium storing computer-executable instructions for a network entity includes computer-executable instructions comprising one or more instructions instructing the network entity to configure an RSTD search window based on a PRS configuration; one or more instructions instructing the network entity to provide the RSTD search window to a UE; and one or more instructions instructing the network entity to transmit a plurality of PRS to the UE, each PRS having the PRS configuration, wherein the plurality of PRS are transmitted in a subset that is less than all subcarriers over a given bandwidth.

In an aspect, a method of operating a UE includes receiving an RSTD search window based on a PRS configuration; receiving a plurality of PRS from a network node, each PRS having the PRS configuration, wherein the plurality of PRS are transmitted in a subset that is less than all subcarriers over a given bandwidth; and determining an RSTD between the network node and a reference node based on the RSTD search window.

In an aspect, a UE includes a transceiver circuitry; a memory circuitry; and a processor circuitry, wherein the transceiver circuitry, the memory circuitry, and the processor circuitry are configured to: receive an RSTD search window based on a PRS configuration; receive a plurality of PRS, from a network node, each PRS having the PRS configuration, wherein the plurality of PRS are transmitted in a subset that is less than all subcarriers over a given bandwidth; and determine an RSTD between the network node and a reference node based on the RSTD search window.

In an aspect, a UE includes means for receiving an RSTD search window based on a PRS configuration; means for receiving a plurality of PRS, from a network node, each PRS having the PRS configuration, wherein the plurality of PRS are transmitted in a subset that is less than all subcarriers over a given bandwidth; and means for determining an RSTD between the network node and a reference node based on the RSTD search window.

In an aspect, a non-transitory computer-readable medium storing computer-executable instructions for a UE includes computer-executable instructions comprising one or more instructions instructing the UE to receive an RSTD search window based on a PRS configuration; one or more instructions instructing the UE to receive a plurality of PRS, from a network node, each PRS having the PRS configuration, wherein the plurality of PRS are transmitted in a subset that is less than all subcarriers over a given bandwidth; and one or more instructions instructing the UE to determine an RSTD between the network node and a reference node based on the RSTD search window.

In an aspect, a method of operating a location server includes determining an RSTD search window based on a PRS configuration; providing the RSTD search window to a UE or a base station serving the UE; and configuring a plurality of PRS to be transmitted to the UE, each PRS having the PRS configuration, wherein the plurality of PRS are to be transmitted in a subset that is less than all subcarriers over a given bandwidth.

In an aspect, a location server includes a transceiver circuitry; a memory circuitry; and a processor circuitry, wherein the transceiver circuitry, the memory circuitry, and the processor circuitry are configured to: determine an RSTD search window based on a PRS configuration; provide the RSTD search window to a UE or a base station serving the UE; and configure a plurality of PRS to be transmitted to the UE, each PRS having the PRS configuration, wherein the plurality of PRS are to be transmitted in a subset that is less than all subcarriers over a given bandwidth.

In an aspect, a location server includes means for determining an RSTD search window based on a PRS configuration; means for providing the RSTD search window to a UE or a base station serving the UE; and means for configuring a plurality of PRS to be transmitted to the UE, each PRS having the PRS configuration, wherein the plurality of PRS are to be transmitted in a subset that is less than all subcarriers over a given bandwidth.

In an aspect, a non-transitory computer-readable medium storing computer-executable instructions for a location server includes computer-executable instructions comprising one or more instructions instructing the location server to determine an RSTD search window based on a PRS configuration; one or more instructions instructing the location server to provide the RSTD search window to a UE or a base station serving the UE; and one or more instructions instructing the location server to configure a plurality of PRS to be transmitted to the UE, each PRS having the PRS configuration, wherein the plurality of PRS are to be transmitted in a subset that is less than all subcarriers over a given bandwidth.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 11 illustrates examples of operating frequency bands for wireless communication systems, according to one or more aspects.

FIG. 12 illustrates examples of frequency overlaps between operating frequency bands, according to one or more aspects.

Figure 1:
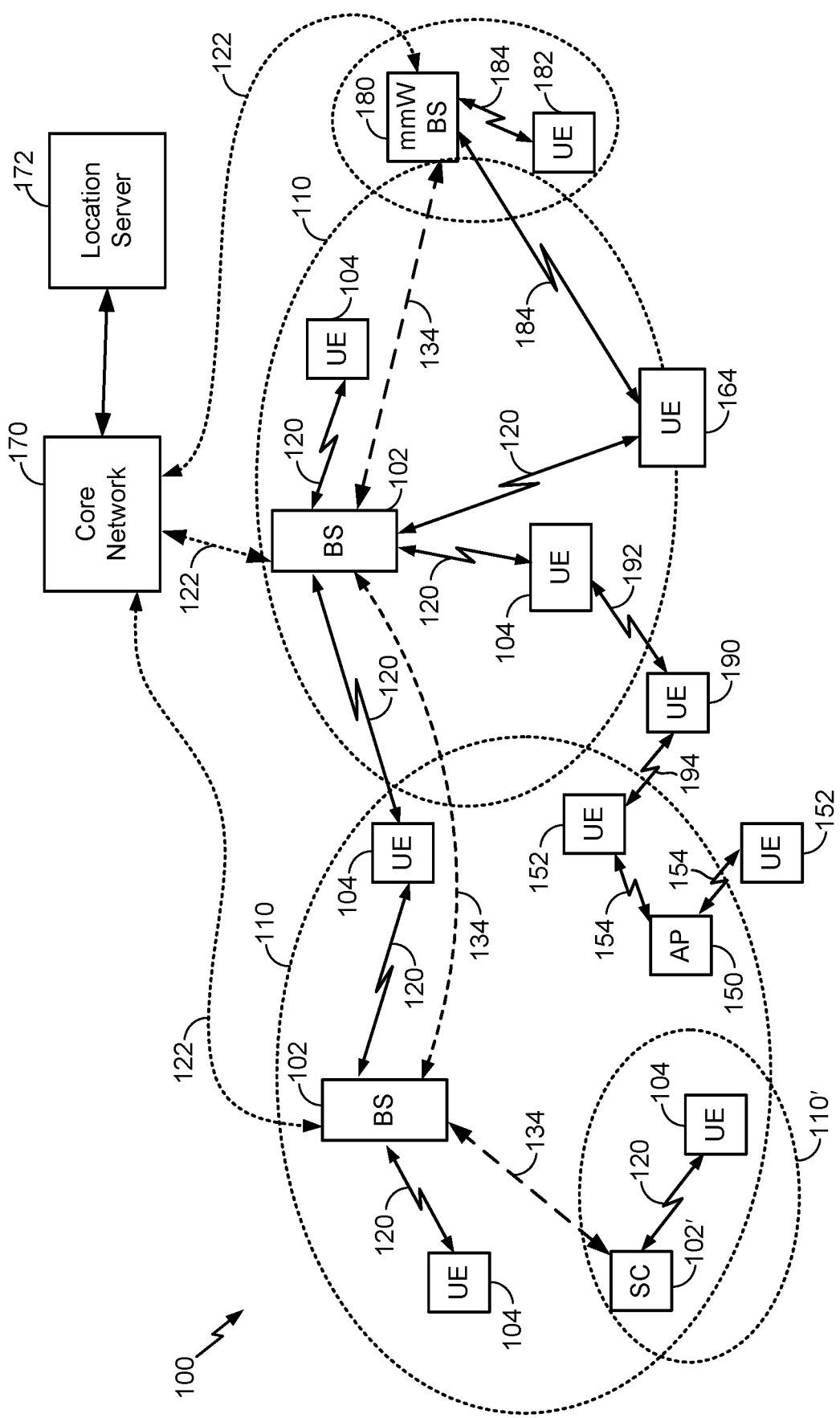
FIG. 1 illustrates an exemplary wireless communications system, according to various aspects of the disclosure.

Elements with like numbers or like labels in different figures are to be considered as corresponding to one another. Elements with a common numeric label followed by different alphabetic suffices may correspond to different examples of a common type of element. Thus, for example, base stations 102A, 102B, 102C and 102D in FIG. 1 are all particular examples of a base station, which may be referred to as a base station 102 when all the examples 102A-102D are applicable.

DETAILED DESCRIPTION

Various aspects described herein generally relate to wireless communication systems, and more particularly to configurable RSTD search windows for OTDOA and multi-RTT based positioning.

These and other aspects are disclosed in the following description and related drawings to show specific examples relating to exemplary aspects. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof. Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable device (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a NR Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

More specifically, LBT is a mechanism by which a transmitter (e.g., a UE on the uplink or a base station on the downlink) applies CCA before using the channel/subband. Thus, before transmission, the transmitter performs a CCA check and listens on the channel/subband for the duration of the CCA observation time, which should not be less than some threshold (e.g., 15 microseconds). The channel may be considered occupied if the energy level in the channel exceeds some threshold (proportional to the transmit power of the transmitter). If the channel is occupied, the transmitter should delay further attempts to access the medium by some random factor (e.g., some number between 1 and 20) times the CCA observation time. If the channel is not occupied, the transmitter can begin transmitting. However, the maximum contiguous transmission time on the channel should be less than some threshold, such as 5 milliseconds.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 102/180) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 102/180 and the cell in which the UE 102/180 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 102/180 in a cell may have different downlink primary carriers. The same is true for the uplink primary carriers. The network is able to change the primary carrier of any UE 102/180 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 102/180 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
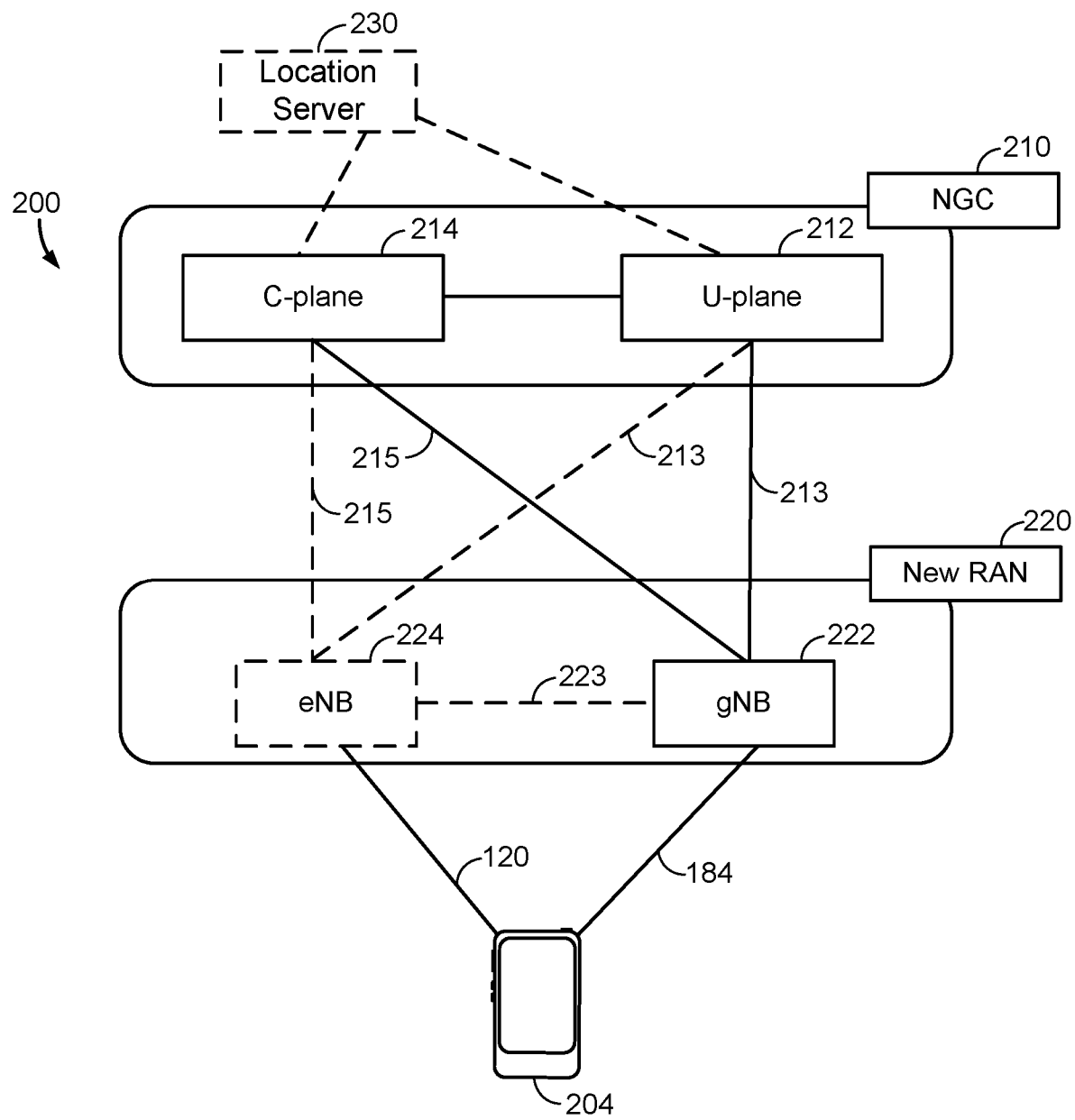
FIGS. 2A and 2B illustrate example wireless network structures, according to various aspects of the disclosure.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
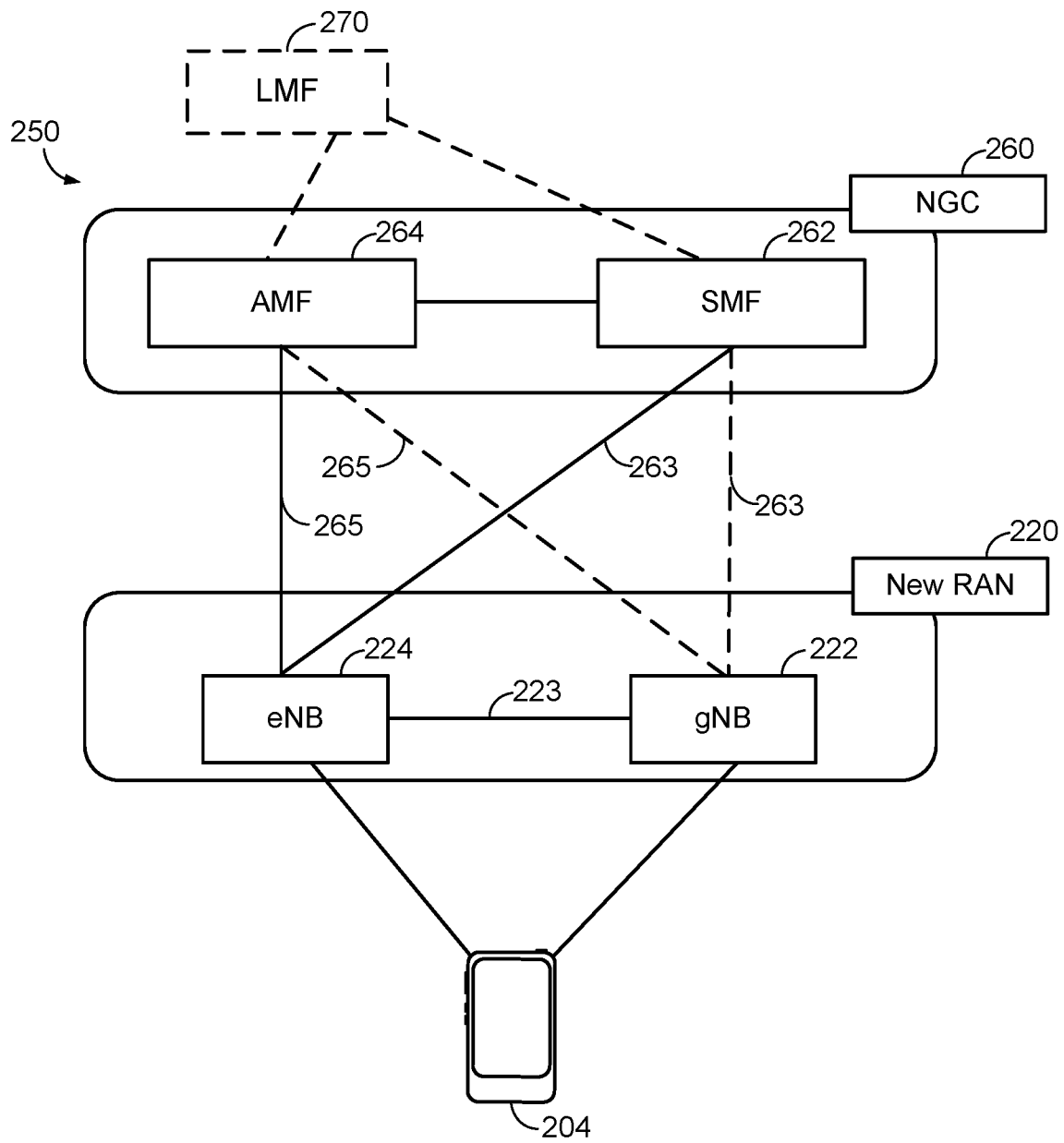

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
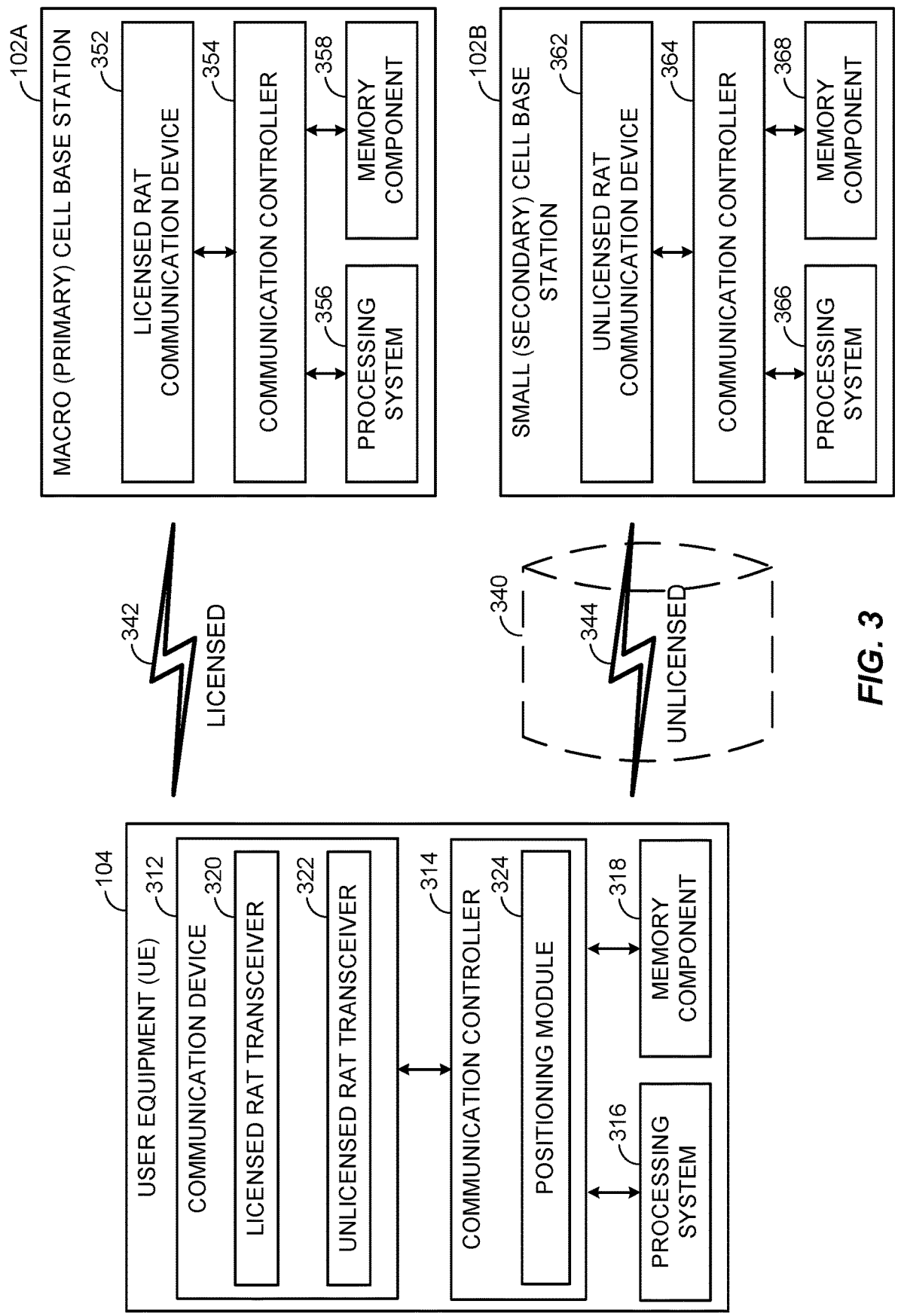
FIG. 3 illustrates an example wireless communication system including a macro cell eNode B and a secondary cell eNode B in communication with a UE according to at least one aspect of the disclosure.

FIG. 3 illustrates an example wireless communication system including a dual-mode UE 104 in communication with two base stations, a macro cell base station 102A and a small cell base station 102B (e.g., small cell base station 102' in FIG. 1). The UE 104 and the base stations 102 each generally include a wireless communication device (represented by the communication devices 312, 352, and 362) for communicating with other network elements via at least one designated RAT. The communication devices 312, 352, and 362 may be variously configured for transmitting and encoding signals (e.g., messages, indications, information, and so on), and, conversely, for receiving and decoding signals (e.g., messages, indications, information, pilots, and so on)

in accordance with the designated RAT. In some aspects, the communication devices 312, 352, and 362 may be implemented as a transceiver (a combination of transmitter and receiver circuitry), or as separate transmitter and receiver circuitry.

As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a receiver chip or similar circuitry simply providing low-level sniffing). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The UE 104 and the base stations 102 may also each generally include a communication controller (represented by the communication controllers 314, 354, and 364) for controlling operation of their respective communication devices 312, 352, and 362 (e.g., directing, modifying, enabling, disabling, etc.). The communication controllers 314, 354, and 364 may operate at the direction of or otherwise in conjunction with respective host system functionality (illustrated as the processing systems 316, 356, and 366 and the memory components 318, 358, and 368). In some aspects, the processing systems 316, 356, and 366 may be implemented as one or more processors, one or more processor cores, a digital signal processor (DSP), an application-specific integrated circuit (ASIC), a field programmable gate array (FPGA), or the like. In some designs, the communication controllers 314, 354, and 364 may be partly or wholly subsumed by the respective host system functionality.

As will be described in more detail herein, the communication controller 314 includes a positioning module 324 that may perform, or cause the performance of, the UE operations for determining the position of the UE 104 as described herein. In an aspect, the positioning module 324 may be a software module storing instructions that, when executed by the processing system 316, cause the UE 104 to perform the UE operations described herein. In another aspect, the positioning module 324 may be a circuit that is part of or coupled to the processing system 316 that performs the UE operations described herein. In yet another aspect, the positioning module 324 may be a combination of hardware and software, such as a firmware component of the UE 104 or a modem for UE 104.

Further, although not illustrated in FIG. 3, the base stations 102 may each include a positioning module that may perform, or cause the performance of, the base station operations for determining a position of the UE 104 as described herein. In an aspect, such a positioning module may be a software module storing instructions that, when executed by the processing system 356/366, cause the base station 102 to perform the base station operations described herein. In another aspect, such a positioning module may be a circuit that is part of or coupled to the processing system 356/366 that performs the base station operations described herein. In yet another aspect, such a positioning module may be a combination of hardware and software, such as a firmware component of the base station 102.

Turning to the illustrated communication in more detail, the UE 104 may transmit and/or receive messages with the macro cell base station 102A via a "primary" wireless link 342 in licensed spectrum. The UE 104 may also transmit and/or receive messages with the small cell base station 102B via a "secondary" wireless link 344 in unlicensed spectrum. Thus, the small cell base station 102B may also be referred to as a secondary cell base station. The messages may include information related to various types of communication (e.g., voice, data, multimedia services, associated control signaling, etc.). In general, the macro cell base station 102A may operate via the primary wireless link 342 in accordance with a licensed RAT (e.g., LTE or 5G). The small cell base station 102B may operate via the secondary wireless link 344 in accordance with an unlicensed RAT (e.g., LTE-Unlicensed™, MulteFire™, WiFi™, 5G in unlicensed spectrum, etc.). The secondary wireless link 344 may operate over a common wireless communication medium of interest, shown by way of example in FIG. 3 as the wireless communication medium 340, which may be shared with still other communication systems and signaling schemes. A medium of this type may be composed of one or more frequency, time, and/or space communication resources (e.g., encompassing one or more channels across one or more carriers) associated with communication between one or more transmitter/receiver pairs.

As a particular example, the wireless communication medium 340 may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the U-NII band used by WLAN technologies, most notably IEEE 802.11x WLAN technologies generally referred to as "WiFi" or as "Wi-Fi." Example systems of this type include different variants of CDMA systems, TDMA systems, FDMA systems, OFDMA systems, SC-FDMA systems, and so on.

In the example of FIG. 3, the communication device 312 of the UE 104 includes a licensed RAT transceiver 320 configured to operate in accordance with the licensed RAT of the macro cell base station 102A and a co-located unlicensed RAT transceiver 322 configured to operate in accordance with the unlicensed RAT of the small cell base station 102B. As an example, the licensed RAT transceiver 320 may operate in accordance with LTE or 5G technology and the unlicensed RAT transceiver 322 may operate in accordance with LTE in unlicensed spectrum, 5G in unlicensed spectrum, or WiFi technology. In some implementations, licensed RAT transceiver 320 and unlicensed RAT transceiver 322 may comprise the same transceiver.

Referring to the processing systems 356 and 366 in more detail, in the downlink, IP packets from a network entity (e.g., location server 230, LMF 270) may be provided to the processing system 356/366. The processing system 356/366 may implement functionality for an RRC layer, a packet data convergence protocol (PDCP) layer, a radio link control (RLC) layer, and a medium access control (MAC) layer. The processing system 356/366 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The communication device 352/362 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. A transmitter of the communication device 352/362 (not shown) handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 104. Each spatial stream may then be provided to one or more different antennas. The transmitter of the communication device 352/362 may modulate an RF carrier with a respective spatial stream for transmission.

At the UE 104, a transceiver 320/322 receives a signal through its respective antenna(s). The transceiver 320/322 recovers information modulated onto an RF carrier and provides the information to the processing system 316. The transceivers 320 and 322 implement Layer-1 functionality associated with various signal processing functions. The transceiver 320/322 may perform spatial processing on the information to recover any spatial streams destined for the UE 104. If multiple spatial streams are destined for the UE 104, they may be combined by the transceiver 320/322 into a single OFDM symbol stream. The transceiver 320/322 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 102. These soft decisions may be based on channel estimates computed by a channel estimator. The soft decisions are then decoded and de-interleaved to recover the data and control signals that were originally transmitted by the base station 102 on the physical channel.

The data and control signals are then provided to the processing system 316, which implements Layer-3 and Layer-2 functionality.

In the UL, the processing system 316 provides demultiplexing between transport and logical channels, packet reassembly, deciphering, header decompression, and control signal processing to recover IP packets from the core network. The processing system 316 is also responsible for error detection.

Similar to the functionality described in connection with the DL transmission by the base station 102, the processing system 316 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

Channel estimates derived by the channel estimator from a reference signal or feedback transmitted by the base station 102 may be used by the transceiver 320/322 to select the appropriate coding and modulation schemes, and to facilitate spatial processing. The spatial streams generated by the transceiver 320/322 may be provided to different antenna(s). The transceiver 320/322 may modulate an RF carrier with a respective spatial stream for transmission.

The UL transmission is processed at the base station 102 in a manner similar to that described in connection with the receiver function at the UE 104. A receiver of the communication device 352/362 (not shown) receives a signal through its respective antenna(s). The communication device 352/362 recovers information modulated onto an RF carrier and provides the information to the processing system 356/366.

In the UL, the processing system 356/366 provides demultiplexing between transport and logical channels, packet reassembly, deciphering, header decompression, control signal processing to recover IP packets from the UE 104. IP packets from the processing system 356/366 may be provided to the core network. The processing system 356/366 is also responsible for error detection.

The various components of the UE 104 and the base stations 102 may communicate with each other over data buses (not shown). The components of FIG. 3 may be implemented in various ways. In some implementations, the components of FIG. 3 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 312, 314, 316, 318, 320, 322, and 324 may be implemented by processor and memory component(s) of the UE 104 (e.g., by execution of appropriate code and/or by appropriate configuration of processor components). Similarly, some or all of the functionality represented by blocks 352, 354, 356, and 358 may be implemented by processor and memory component(s) of the base station 102A (e.g., by execution of appropriate code and/or by appropriate configuration of processor components). Also, some or all of the functionality represented by blocks 362, 364, 366, and 368 may be implemented by processor and memory component(s) of the base station 102B (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 316, 356, and 366, the communication devices 312, 352, and 362, the communication controllers 314, 354, and 364, etc.

To support position estimations in terrestrial wireless networks, a UE 104 can be configured to measure and report the OTDOA between reference RF signals received from two or more network nodes (e.g., different base stations 102 or different TRPs (e.g., antenna arrays) belonging to the same base station 102). Such reference signals may be referred to as positioning reference signaling (PRS) signals in LTE and navigation reference signaling (NRS) signals in 5G. As used herein, the term "positioning reference signal" or PRS refers to LTE PRS, 5G NRS, or any other type of reference signal that can be used for positioning, such as cell-specific reference signals (CRS), tracking reference signals (TRS), channel state information reference signals (CSI-RS), primary synchronization signals (PSS), secondary synchronization signals (SSS), and the like.

As discussed further below, OTDOA is a positioning method for wireless networks that provide wireless access using NR, is a multilateration method in which a UE 104 measures the time difference, known as an RSTD, between specific reference RF signals (e.g., PRS, CRS, CSI-RS, etc.) transmitted by different pairs of network nodes (e.g., base stations 102, antennas of base stations 102, etc.) and either reports these time differences to a location server, such as the location server 230, LMF 270, or computes a location estimate itself from these time differences.

Figure 4:
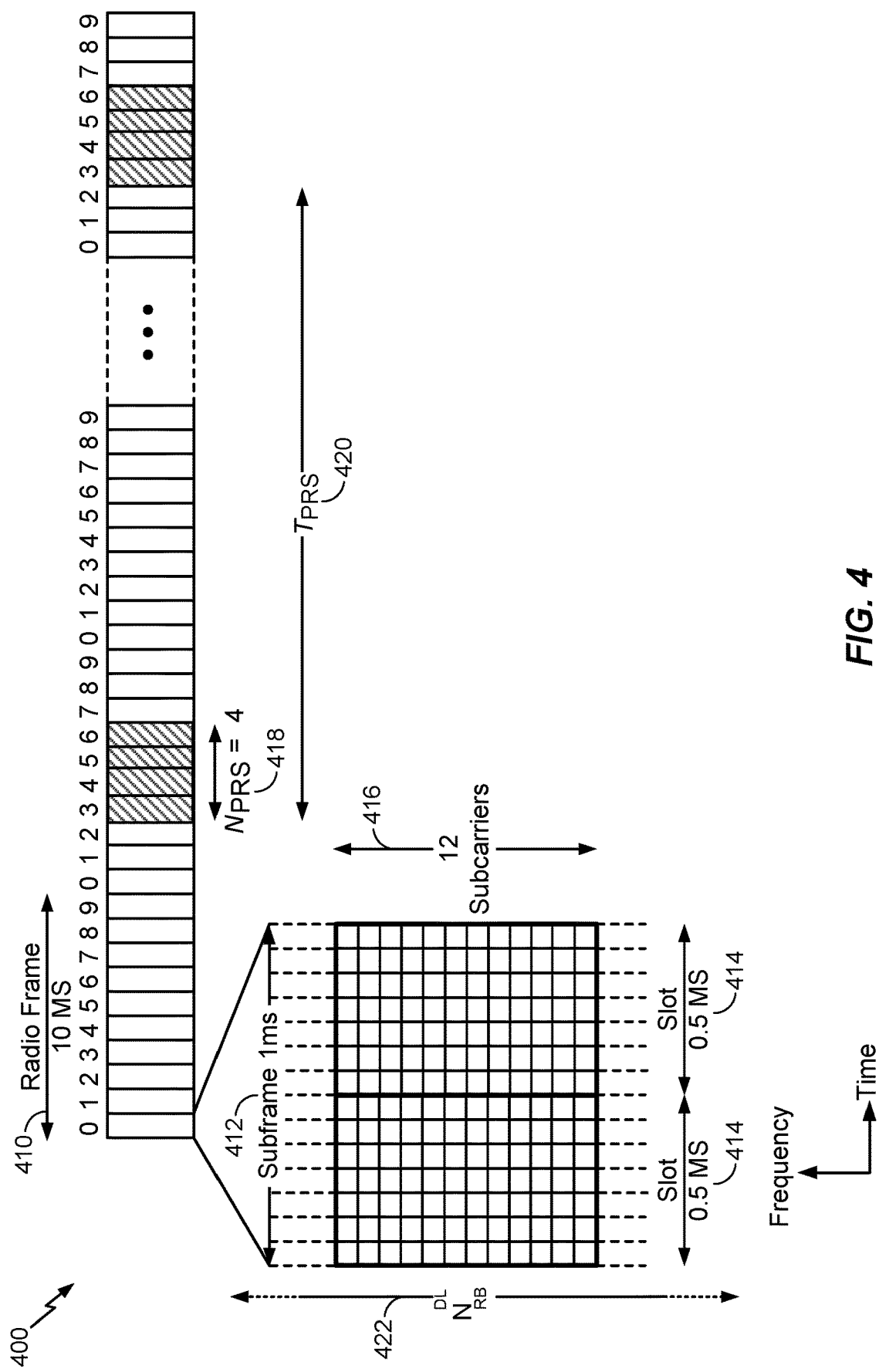
FIG. 4 is a diagram of a structure of an example LTE subframe sequence with PRS positioning occasions.

FIG. 4 shows a structure of an example subframe sequence 400 with PRS positioning occasions. Subframe sequence 400 may be applicable to broadcast of PRS signals from base stations 102—in communications system 100. While FIG. 4 provides an example of a subframe sequence for LTE, similar or different subframe sequence implementations may be realized for other communication technologies/protocols, such as NR. In FIG. 4, time is represented horizontally (e.g., on an X axis) with time increasing from left to right, while frequency is represented vertically (e.g., on a Y axis) with frequency increasing (or decreasing) from bottom to top. As shown in FIG. 4, downlink and uplink radio frames 410 may be of 10 ms duration each. For downlink frequency division duplex (FDD) mode, radio frames 410 are organized, in the illustrated embodiments, into ten subframes 412 of 1 ms duration each. Each subframe 412 comprises two slots 414, each of, for example, 0.5 ms duration.

In the frequency domain, the available bandwidth may be divided into uniformly spaced orthogonal subcarriers 416. For example, for a normal length cyclic prefix using, for example, 15 kHz spacing, subcarriers 416 may be grouped into a group of twelve (12) subcarriers. Each grouping, which comprises the 12 subcarriers 416, is termed a resource block (RB) and, in the example above, the number of subcarriers in the resource block may be written as $N_{SC}^{RB}=12$. For a given channel bandwidth, the number of available resource blocks on each channel 422, which is also called the transmission bandwidth configuration 422, is indicated as $N_{RB}^{DL}$. For example, for a 3 MHz channel bandwidth in the above example, the number of available resource blocks on each channel 422 is given by $N_{RB}^{DL}=15$.

In the communications system 100 illustrated in FIG. 1, a base station 102, such as macro cell base station 102A or any of small cell base stations 102B-110D, may transmit frames, or other physical layer signaling sequences, supporting PRS signals (i.e. a downlink (DL) PRS) according to frame configurations either similar to, or the same as that, shown in FIG. 4 and (as described later) in FIG. 5, which may be measured and used for UE (e.g., UE 104) position determination. As noted, other types of wireless nodes and base stations (e.g., a gNB or WiFi AP) may also be configured to transmit PRS signals configured in a manner similar to (or the same as) that depicted in FIGS. 4 and 5. Since transmission of a PRS by a wireless node or base station is directed to all UEs within radio range, a wireless node or base station can also be considered to transmit (or broadcast) a PRS.

A PRS may be transmitted by wireless nodes (e.g., base stations 102) after appropriate configuration (e.g., by an operations and maintenance (O&M) server). A PRS may be transmitted in special positioning subframes that are grouped into positioning occasions. PRS occasions may be grouped into one or more PRS occasion groups. For example, in LTE, a PRS positioning occasion can comprise a number $N_{PRS}$ of consecutive positioning subframes where the number $N_{PRS}$ may be between 1 and 160 (e.g., may include the values 1, 2, 4 and 6 as well as other values). The PRS positioning occasions for a cell supported by a wireless node may occur periodically at intervals, denoted by a number $T_{PRS}$, of millisecond (or subframe) intervals where $T_{PRS}$ may equal 5, 10, 20, 40, 80, 160, 320, 640, or 1280 (or any other appropriate value). As an example, FIG. 4 illustrates a periodicity of positioning occasions where $N_{PRS}$ equals 4 418 and $T_{PRS}$ is greater than or equal to 20 420. In some aspects, $T_{PRS}$ may be measured in terms of the number of subframes between the start of consecutive positioning occasions.

As discussed herein, in some aspects, OTDOA assistance data may be provided to a UE 104 by a location server 230 or LMF 270 for a "reference cell" and one or more "neighbor cells" or "neighboring cells" relative to the "reference cell." For example, the assistance data may provide the center channel frequency of each cell, various PRS configuration parameters (e.g., $N_{PRS}$, $T_{PRS}$, muting sequence, frequency hopping sequence, PRS ID, PRS bandwidth), a cell global ID, PRS signal characteristics associated with a directional PRS, and/or other cell related parameters applicable to OTDOA or some other position method.

PRS-based positioning by a UE 104 may be facilitated by indicating the serving cell for the UE 104 in the OTDOA assistance data (e.g., with the reference cell indicated as being the serving cell).

In some aspects, OTDOA assistance data may also include "expected RSTD" parameters, which provide the UE 104 with information about the RSTD values the UE 104 is expected to measure at its current location between the reference cell and each neighbor cell, together with an uncertainty of the expected RSTD parameter. The expected RSTD, together with the associated uncertainty, may define a search window for the UE 104 within which the UE 104 is expected to measure the RSTD value. In 5G NR, the expected RSTD value is a single value defined as the RSTD the UE 104 is expected to measure (at the UE's 104 location). The value range of the expected RSTD is +/−500 microseconds (μs). When any of the resources used for the DL positioning measurement are in FR1, the value range for the uncertainty of the expected RSTD is +/−32 μs. When all of the resources used for the DL positioning measurement are in FR2, the value range for the uncertainty of the expected RSTD is +/−8 μs. OTDOA assistance information may also include PRS configuration information parameters, which allow a UE 104 to determine when a PRS positioning occasion occurs on signals received from various neighbor cells relative to PRS positioning occasions for the reference cell, and to determine the PRS sequence transmitted from various cells in order to measure a signal Time of Arrival (ToA) or RSTD.

Using the RSTD measurements, the known absolute or relative transmission timing of each cell, and the known position(s) of wireless node physical transmitting antennas for the reference and neighboring cells, the UE 104's position may be calculated (e.g., by the UE 104 or by the location server 230/LMF 270). More particularly, the RSTD for a neighbor cell "k" relative to a reference cell "Ref," may be given as (ToA$_k$−ToA$_{Ref}$), where the ToA values may be measured modulo one subframe duration (1 ms) to remove the effects of measuring different subframes at different times. ToA measurements for different cells may then be converted to RSTD measurements and sent to the location server 230/LMF 270 by the UE 104. Using (i) the RSTD measurements, (ii) the known absolute or relative transmission timing of each cell, (iii) the known position(s) of physical transmitting antennas for the reference and neighboring cells, and/or (iv) directional PRS characteristics such as a direction of transmission, the UE 104's position may be determined.

A collection of resource elements that are used for transmission of PRS is referred to as a "PRS resource." The collection of resource elements can span multiple physical resource blocks (PRBs) in the frequency domain and N (e.g., 1 or more) consecutive symbol(s) within a slot 414 in the time domain. In a given OFDM symbol, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). Currently, one antenna port is supported. The comb size indicates the number of subcarriers in each symbol carrying PRS. For example, a comb-size of comb-4 means that every fourth subcarrier of a given symbol carries PRS.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and may be associated with a particular TRP (identified by a cell ID) transmitted by an antenna panel of a base station. A PRS resource ID in a PRS resource set is associated with a single beam (and/or beam ID) transmitted from a single TRP (where a TRP may transmit one or more beams). That is, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance, a "positioning occasion," "a positioning instance," or simply an "occasion" or "instance."

Figure 5:
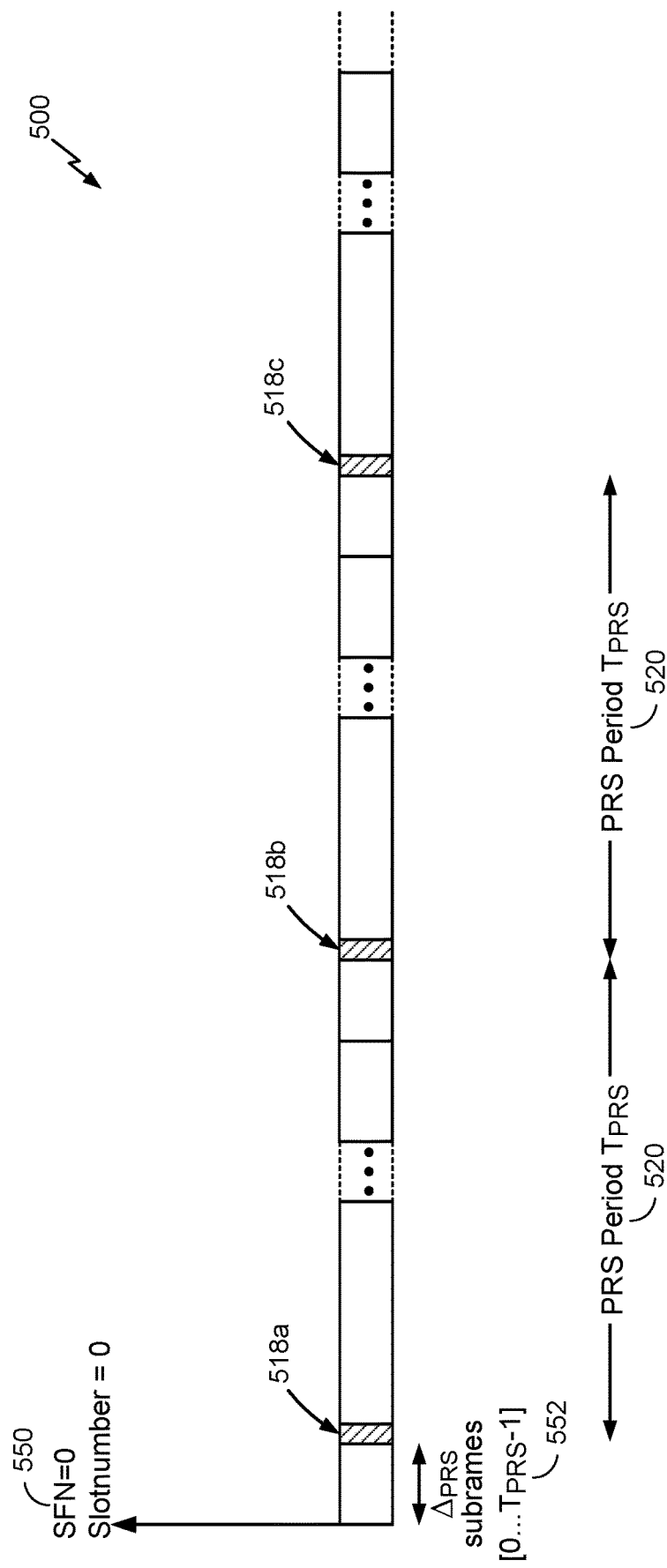
FIGS. 5 and 6 are diagrams illustrating further aspects of PRS transmission for a cell supported by a wireless node.

FIG. 5 illustrates an exemplary PRS configuration 500 for a cell supported by a wireless node (such as a base station 102). Again, PRS transmission for LTE is assumed in FIG. 5, although the same or similar aspects of PRS transmission to those shown in and described for FIG. 5 may apply to NR and/or other wireless technologies. FIG. 5 shows how PRS positioning occasions are determined by a system frame number (SFN), a cell specific subframe offset (Δ$_{PRS}$) 552, and the PRS periodicity (T$_{PRS}$) 520. Typically, the cell specific PRS subframe configuration is defined by a "PRS Configuration Index" I$_{PRS}$ included in the OTDOA assistance data. The PRS periodicity (T$_{PRS}$) 520 and the cell specific subframe offset (Δ$_{PRS}$) are defined based on the PRS configuration index I$_{PRS}$, as illustrated in Table 1 below.

TABLE 1

| PRS configuration Index I$_{PRS}$ | PRS periodicity T$_{PRS}$ (subframes) | PRS subframe offset Δ$_{PRS}$ (subframes) |
| --- | --- | --- |
| 0-159 | 160 | I$_{PRS}$ |
| 160-479 | 320 | I$_{PRS}$ − 160 |
| 480-1119 | 640 | I$_{PRS}$ − 480 |
| 1120-2399 | 1280 | I$_{PRS}$ − 1120 |
| 2400-2404 | 5 | I$_{PRS}$ − 2400 |
| 2405-2414 | 10 | I$_{PRS}$ − 2405 |
| 2415-2434 | 20 | I$_{PRS}$ − 2415 |
| 2435-2474 | 40 | I$_{PRS}$ − 2435 |
| 2475-2554 | 80 | I$_{PRS}$ − 2475 |
| 2555-4095 | Reserved | |

A PRS configuration is defined with reference to the system frame number (SFN) of a cell that transmits PRS. PRS instances, for the first subframe of the N$_{PRS}$ downlink subframes comprising a first PRS positioning occasion, may satisfy:

$$(10 \times n_f + \lfloor n_s/2 \rfloor - \Delta_{PRS}) \bmod T_{PRS} = 0,$$

where $n_f$ is the SFN with $0 \leq n_f \leq 1023$, $n_s$ is the slot number within the radio frame defined by $n_f$ with $0 \leq n_s \leq 19$, T$_{PRS}$ is the PRS periodicity 520, and Δ$_{PRS}$ is the cell-specific subframe offset 552.

As shown in FIG. 5, the cell specific subframe offset Δ$_{PRS}$ 552 may be defined in terms of the number of subframes transmitted starting from system frame number 0 (Slot 'Number 0', marked as slot 550) to the start of the first (subsequent) PRS positioning occasion. In the example in FIG. 5, the number of consecutive positioning subframes (N$_{PRS}$) in each of the consecutive PRS positioning occasions 518a, 518b, and 518c equals 4.

In some aspects, when a UE 104 receives a PRS configuration index I$_{PRS}$ in the OTDOA assistance data for a particular cell, the UE 104 may determine the PRS periodicity T$_{PRS}$ 520 and PRS subframe offset Δ$_{PRS}$ using Table 1. The UE 104 may then determine the radio frame, subframe and slot when a PRS is scheduled in the cell (e.g., using equation (1)). The OTDOA assistance data may be determined by, for example, the location server 172, and includes assistance data for a reference cell, and a number of neighbor cells supported by various wireless nodes.

Typically, PRS occasions from all cells in a network that use the same frequency are aligned in time and may have a fixed known time offset (e.g., cell-specific subframe offset 552) relative to other cells in the network that use a different frequency. In SFN-synchronous networks all wireless nodes (e.g., base stations 102) may be aligned on both frame boundary and system frame number. Therefore, in SFN-synchronous networks all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time.

A UE 104 may determine the timing of the PRS occasions of the reference and neighbor cells for OTDOA positioning, if the UE 104 can obtain the cell timing (e.g., SFN) of at least one of the cells, e.g., the reference cell or a serving cell. The timing of the other cells may then be derived by the UE 104 based, for example, on the assumption that PRS occasions from different cells overlap.

For LTE systems, the sequence of subframes used to transmit PRS (e.g., for OTDOA positioning) may be characterized and defined by a number of parameters, as described previously, comprising: (i) a reserved block of bandwidth (BW), (ii) the configuration index $I_{PRS}$, (iii) the duration $N_{PRS}$, (iv) an optional muting pattern; and (v) a muting sequence periodicity $T_{REP}$ that can be implicitly included as part of the muting pattern in (iv) when present. In some cases, with a fairly low PRS duty cycle, $N_{PRS}=1$, $T_{PRS}=160$ subframes (equivalent to 160 ms), and BW=1.4, 3, 5, 10, 15, or 20 MHz. To increase the PRS duty cycle, the $N_{PRS}$ value can be increased to six (i.e., $N_{PRS}=6$) and the bandwidth (BW) value can be increased to the system bandwidth (i.e., BW=LTE system bandwidth in the case of LTE). An expanded PRS with a larger $N_{PRS}$ (e.g., greater than six) and/or a shorter $T_{PRS}$ (e.g., less than 160 ms), up to the full duty cycle (i.e., $N_{PRS}=T_{PRS}$), may also be used in later versions of LPP. A directional PRS may be configured as just described and may, for example, use a low PRS duty cycle (e.g., $N_{PRS}=1$, $T_{PRS}=160$ subframes) or a high duty cycle.

Figure 6:
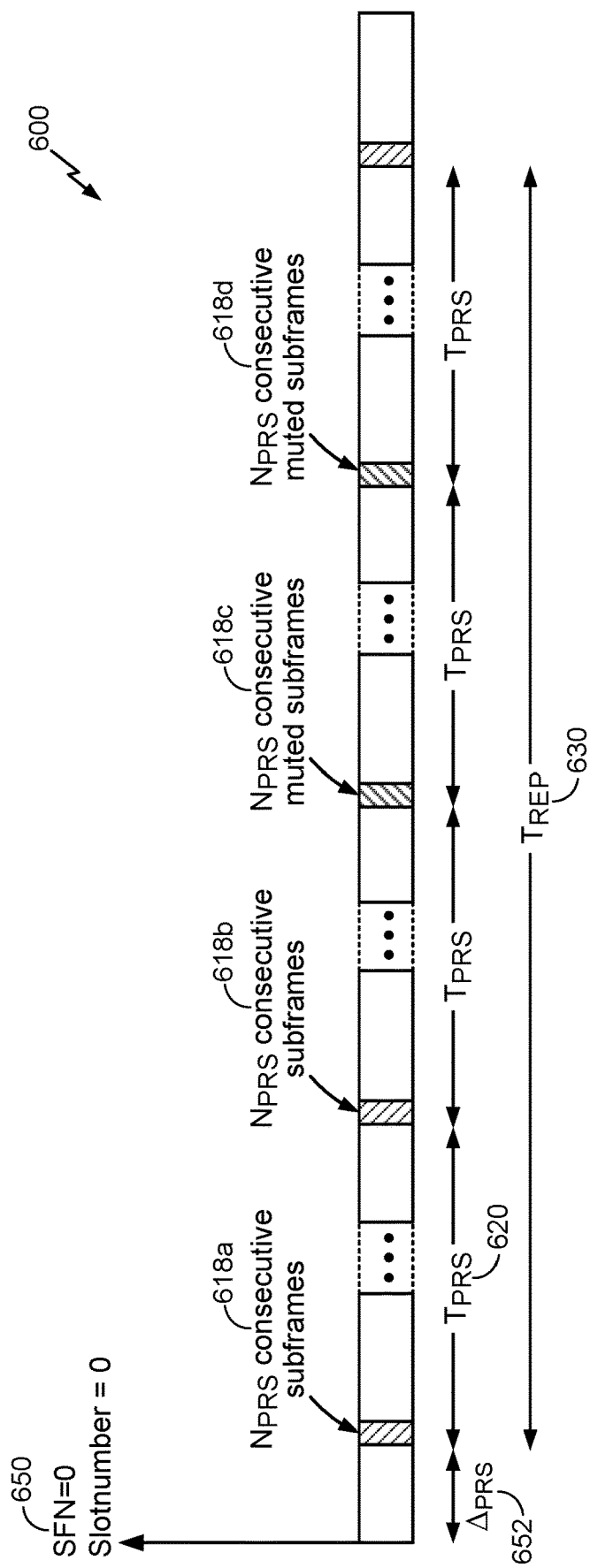

FIG. 6 illustrates an exemplary PRS configuration 600 in LTE that includes a PRS muting sequence. Like FIG. 5, FIG. 6 shows how PRS positioning occasions are determined by an SFN, a cell specific subframe offset ($\Delta_{PRS}$) 652, and the PRS Periodicity ($T_{PRS}$) 620. As shown in FIG. 6, the cell specific subframe offset $\Delta_{PRS}$ 652 may be defined in terms of the number of subframes transmitted starting from system frame number 0 (Slot 'Number 0', marked as slot 650) to the start of the first (subsequent) PRS positioning occasion. In the example in FIG. 6, the number of consecutive positioning subframes ($N_{PRS}$) in each of the consecutive PRS positioning occasions 618a and 618b equals 4.

Within each positioning occasion, PRS are generally transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and ToA and RSTD measurement, by UEs (such as the UE 104), of PRS signals that are not muted (by avoiding interference from PRS signals that have been muted). For example, when the (strong) PRS signal the UE 104 receives from one base station 102 is muted, the (weak) PRS signals from a neighboring base station 102 can be more easily detected by the UE 104. Muting may be viewed as the non-transmission of a PRS for a given positioning occasion for a particular cell. Muting patterns (also referred to as muting sequences) may be signaled to a UE 104 using bit strings. For example, in a bit string signaled to indicate a muting pattern, if a bit at position j is set to '0', then the UE 104 may infer that the PRS is muted for a $j^{th}$ positioning occasion.

With reference to FIG. 6, the muting sequence periodicity $T_{REP}$ 630 includes two consecutive PRS positioning occasions 618a and 618b followed by two consecutive muted PRS positioning occasions 618c and 618d. In LTE, the PRS muting configuration of a cell is only defined by a periodic muting sequence (e.g., muting sequence periodicity $T_{REP}$ 630), as opposed to an aperiodic or semi-persistent muting sequence. As such, the two consecutive PRS positioning occasions 618a and 618b followed by the two consecutive muted PRS positioning occasions 618c and 618d will repeat for the next muting sequence periodicity $T_{REP}$ 630.

To further improve hearability of PRS, positioning subframes may be low-interference subframes that are transmitted without user data channels. As a result, in ideally synchronized networks, PRS may receive interference from other cell's PRS with the same PRS pattern index (i.e., with the same frequency shift), but not from data transmissions. The frequency shift, in LTE, for example, is defined as a function of a PRS ID for a cell or other transmission point (TP) (denoted as $N_{ID}^{PRS}$) or as a function of a physical cell identifier (PCI) (denoted as $N_{ID}^{cell}$) if no PRS ID is assigned, which results in an effective frequency re-use factor of 6.

To also improve hearability of a PRS (e.g., when PRS bandwidth is limited such as with only 6 resource blocks corresponding to 1.4 MHz bandwidth), the frequency band for consecutive PRS positioning occasions (or consecutive PRS subframes) may be changed in a known and predictable manner via frequency hopping. In addition, a cell supported by a wireless node may support more than one PRS configuration (e.g., PRS configuration 400/500), where each PRS configuration may comprise a distinct frequency offset (vshift), a distinct carrier frequency, a distinct bandwidth, a distinct code sequence, and/or a distinct sequence of PRS positioning occasions with a particular number of subframes ($N_{PRS}$) per positioning occasion and a particular periodicity ($T_{PRS}$). In some implementation, one or more of the PRS configurations supported in a cell may be for a directional PRS and may then have additional distinct characteristics such as a distinct direction of transmission, a distinct range of horizontal angles and/or a distinct range of vertical angles. Further enhancements of a PRS may also be supported by a wireless node.

Figure 7:
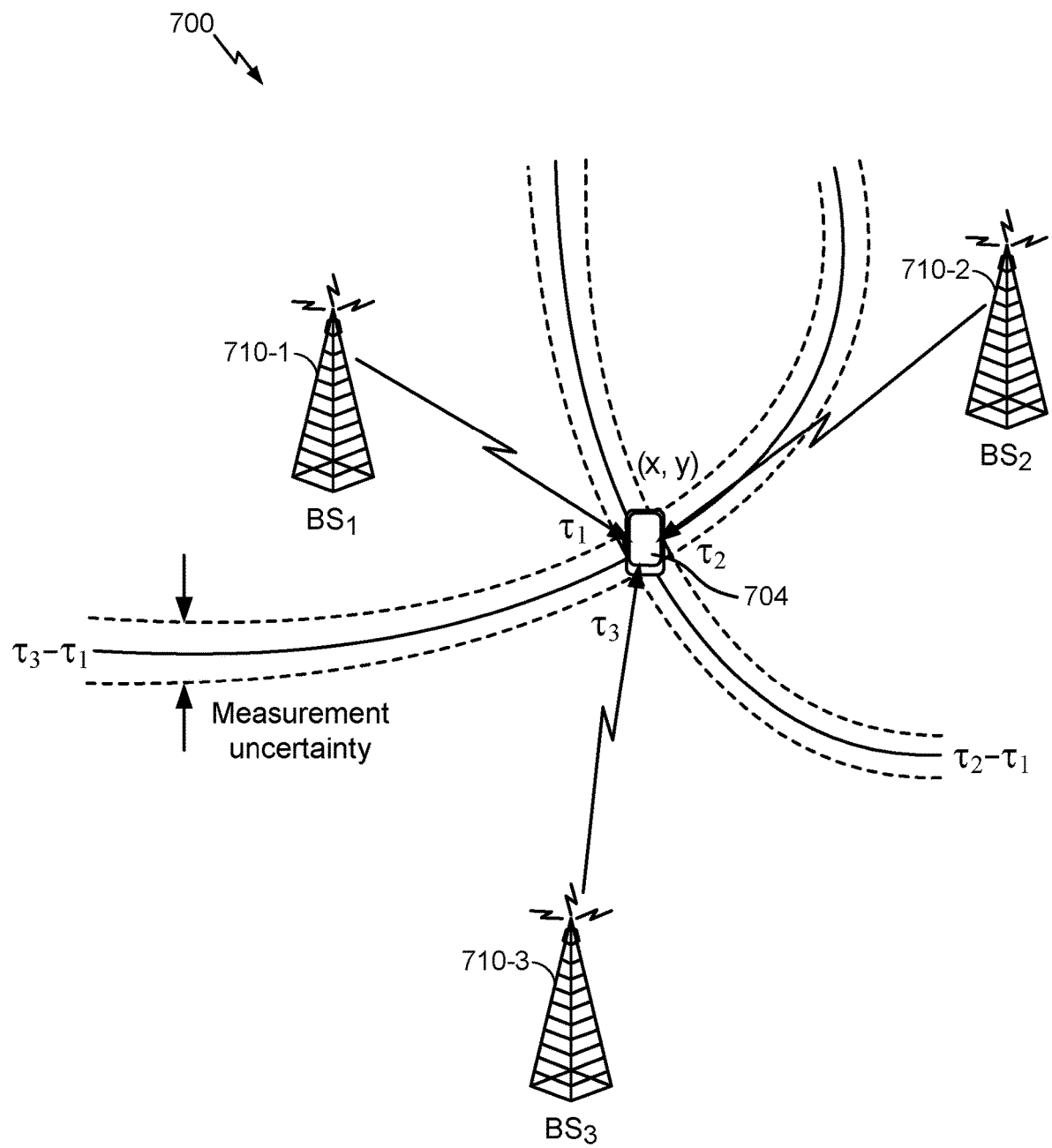
FIG. 7 is a diagram illustrating an exemplary technique for determining a position of a mobile device using information obtained from a plurality of base stations.

FIG. 7 illustrates an exemplary wireless communications system 700 according to various aspects of the disclosure. In the example of FIG. 7, a UE 704 (e.g., any of the UEs described herein) is attempting to calculate an estimate of its position, or assist another entity (e.g., a base station or core network component, another UE, a location server, a third party application, etc.) to calculate an estimate of its position. The UE 704 may communicate wirelessly with a plurality of base stations 702-1, 702-2, and 702-3 (collectively, base stations 702), which may correspond to any of the base stations described herein, using RF signals and standardized protocols for the modulation of the RF signals and the exchange of information packets. By extracting different types of information from the exchanged RF signals, and utilizing the layout of the wireless communications system 700 (i.e., the base stations locations, geometry, etc.), the UE 704 may determine its position, or assist in the determination of its position, in a predefined reference coordinate system. In an aspect, the UE 704 may specify its position using a two-dimensional coordinate system; however, the aspects disclosed herein are not so limited, and may also be applicable to determining positions using a three-dimensional coordinate system, if the extra dimension is desired. Additionally, while FIG. 7 illustrates one UE 704 and three base stations 702, as will be appreciated, there may be more UEs 704 and more or fewer base stations 702.

To support position estimates, the base stations 702 may be configured to broadcast reference RF signals (e.g., PRS, CRS, CSI-RS, synchronization signals, etc.) to UEs 704 in their coverage area to enable a UE 704 to measure characteristics of such reference RF signals. For example, the UE 704 may use the OTDOA positioning method, and the UE 704 may measure the RSTD between specific reference RF signals (e.g., PRS, CRS, CSI-RS, etc.) transmitted by different pairs of network nodes (e.g., base stations 702, antennas of base stations 702, etc.).

Generally, RSTDs are measured between a reference network node (e.g., base station 702-1 in the example of FIG. 7) and one or more neighbor network nodes (e.g., base stations 702-2 and 702-3 in the example of FIG. 7). The reference network node remains the same for all RSTDs measured by the UE 704 for any single positioning use of OTDOA and would typically correspond to the serving cell for the UE 704 or another nearby cell with good signal strength at the UE 704. In an aspect, where a measured network node is a cell supported by a base station, the neighbor network nodes would normally be cells supported by base stations different from the base station for the reference cell and may have good or poor signal strength at the UE 704. The location computation can be based on the measured time differences (e.g., RSTDs) and knowledge of the network nodes' locations and relative transmission timing (e.g., regarding whether network nodes are accurately synchronized or whether each network node transmits with some known time difference relative to other network nodes).

To assist positioning operations, a location server (e.g., location server 230, LMF 270) may provide OTDOA assistance data to the UE 704 for the reference network node (e.g., base station 702-1 in the example of FIG. 7) and the neighbor network nodes (e.g., base stations 702-2 and 702-3 in the example of FIG. 7) relative to the reference network node. For example, the assistance data may provide the center channel frequency of each network node, various reference RF signal configuration parameters (e.g., the number of consecutive positioning subframes, periodicity of positioning subframes, muting sequence, frequency hopping sequence, reference RF signal ID, reference RF signal bandwidth), a network node global ID, and/or other cell related parameters applicable to OTDOA, as described above. The OTDOA assistance data may also indicate the serving cell for the UE 704 as the reference network node.

In an aspect, while the location server (e.g., location server 230, LMF 270) may send the assistance data to the UE 704, alternatively, the assistance data can originate directly from the network nodes (e.g., base stations 702) themselves (e.g., in periodically broadcasted overhead messages, etc.). Alternatively, the UE 704 can detect neighbor network nodes itself without the use of assistance data.

In the example of FIG. 7, the measured time differences between the reference cell of base station 702-1 and the neighboring cells of base stations 702-2 and 702-3 are represented as $\tau_2 - \tau_1$ and $\tau_3 - \tau_1$, where $\tau_1$, $\tau_2$, and $\tau_3$ represent the transmission time of a reference RF signal from the transmitting antenna(s) of base station 702-1, 702-2, and 702-3, respectively, to the UE 704, and includes any measurement noise at the UE 704. The UE 704 may then convert the ToA measurements for different network nodes to RSTD measurements and (optionally) send them to the location server. Using (i) the RSTD measurements, (ii) the known absolute or relative transmission timing of each network node, (iii) the known position(s) of physical transmitting antennas for the reference and neighboring network nodes, and/or (iv) directional reference RF signal characteristics such as a direction of transmission, the UE's 704 position may be determined (either by the UE 704 or the location server).

The ToA $T_i$ at the UE 704 for the shortest path from base station i is $$T_i = \tau_i + \frac{D_i}{c},$$

where $D_i$ is the Euclidean distance between the base stations i with location ($q_i$) and the UE 704 with location (p), c is the speed of light in the air (299700 km/s), and $q_i$ is known through the cell information database. The Euclidean distance (i.e., the line distance between two points) is given by:

$$c(T_i - \tau_i) = \sqrt{2}\, R\sqrt{1 - \sin(\varphi_1)\sin(\varphi_2) - \cos(\varphi_1)\cos(\varphi_2)\cos(\beta_1 - \beta_2)},$$

where D is the distance between two points on the surface of the earth, R is the radius of the earth (6371 km), $\varphi_1$, $\varphi_2$ is the latitude (in radians) of the first point and the latitude (in radians) of the second point, respectively, and $\beta_1$, $\beta_2$ is the longitude (in radians) of the first point and the latitude (in radians) of the second point, respectively.

In order to identify the ToA of a reference RF signal transmitted by a given network node, the UE 104 first jointly processes all the resource elements (REs) on the channel on which that network node (e.g., base station 702) is transmitting the reference RF signal, and performs an inverse Fourier transform to convert the received RF signals to the time domain. The conversion of the received RF signals to the time domain is referred to as estimation of the channel energy response (CER). The CER shows the peaks on the channel over time, and the earliest "significant" peak should therefore correspond to the ToA of the reference RF signal. Generally, a UE will use a noise-related quality threshold to filter out spurious local peaks, thereby presumably correctly identifying significant peaks on the channel. For example, a UE 704 may chose a ToA estimate that is the earliest local maximum of the CER that is at least X dB higher than the median of the CER and a maximum Y dB lower than the main peak on the channel. The UE 704 determines the CER for each reference RF signal from each network node in order to determine the ToA of each reference RF signal from the different network nodes.

When the UE 704 obtains a location estimate itself using OTDOA measured time differences, the necessary additional data (e.g., network nodes' locations and relative transmission timing) may be provided to the UE 704 by a location server (e.g., location server 230, LMF 270). In some implementations, a location estimate for the UE 704 may be obtained (e.g., by the UE 704 itself or by the location server) from OTDOA measured time differences and from other measurements made by the UE 704 (e.g., measurements of signal timing from global positioning system (GPS) or other global navigation satellite system (GNSS) satellites). In these implementations, known as hybrid positioning, the OTDOA measurements may contribute towards obtaining the UE's 704 location estimate but may not wholly determine the location estimate.

Uplink time difference of arrival (UTDOA) is a similar positioning method to OTDOA, but is based on uplink reference RF signals transmitted by the UE (e.g., UE 704). Further, transmission and/or reception beamforming at the network node and/or UE 704 can enable wideband bandwidth at the cell edge for increased precision. Beam refinements may also leverage channel reciprocity procedures in NR.

As used herein, a "network node" may be a base station (e.g., a base station 102), a cell of a base station (e.g., a cell of a base station 102), a remote radio head, an antenna of a base station (e.g., an antenna of a base station 102, where the locations of the antennas of a base station are distinct from the location of the base station itself), an array of antennas of a base station (e.g., an array of antennas of a base station 102, where the locations of the antenna arrays are distinct from the location of the base station itself), or any other network entity capable of transmitting reference RF signals. Further, as used herein, a "network node" may refer to either a network node or a UE.

The term "position estimate" is used herein to refer to an estimate of a position for a UE (e.g., UE 104), which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "location estimate," a "fix estimate," or by some other term. The means of obtaining a location estimate may be referred to generically as "positioning," "locating," or "position fixing." A particular solution for obtaining a position estimate may be referred to as a "position solution." A particular method for obtaining a position estimate as part of a position solution may be referred to as a "position method" or as a "positioning method."

Figure 8A:
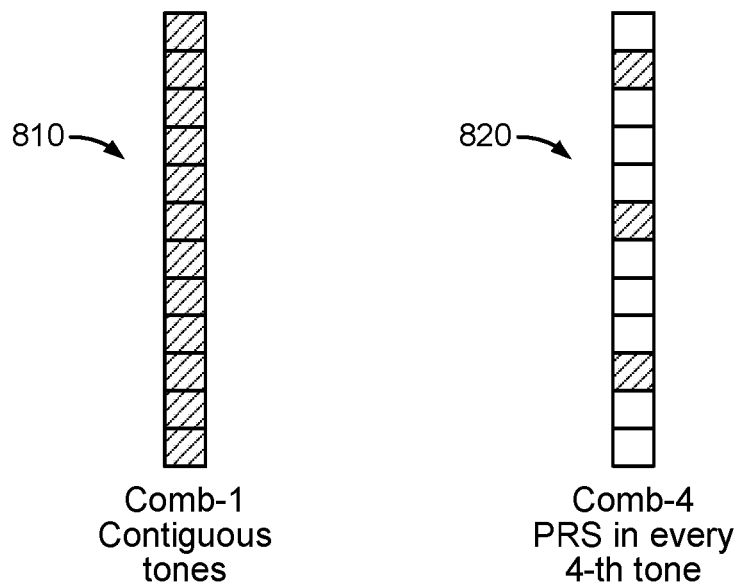
FIGS. 8A and 8B illustrate a performance comparison between non-subsampled and subsampled subcarriers of a given bandwidth.
Figure 8B:
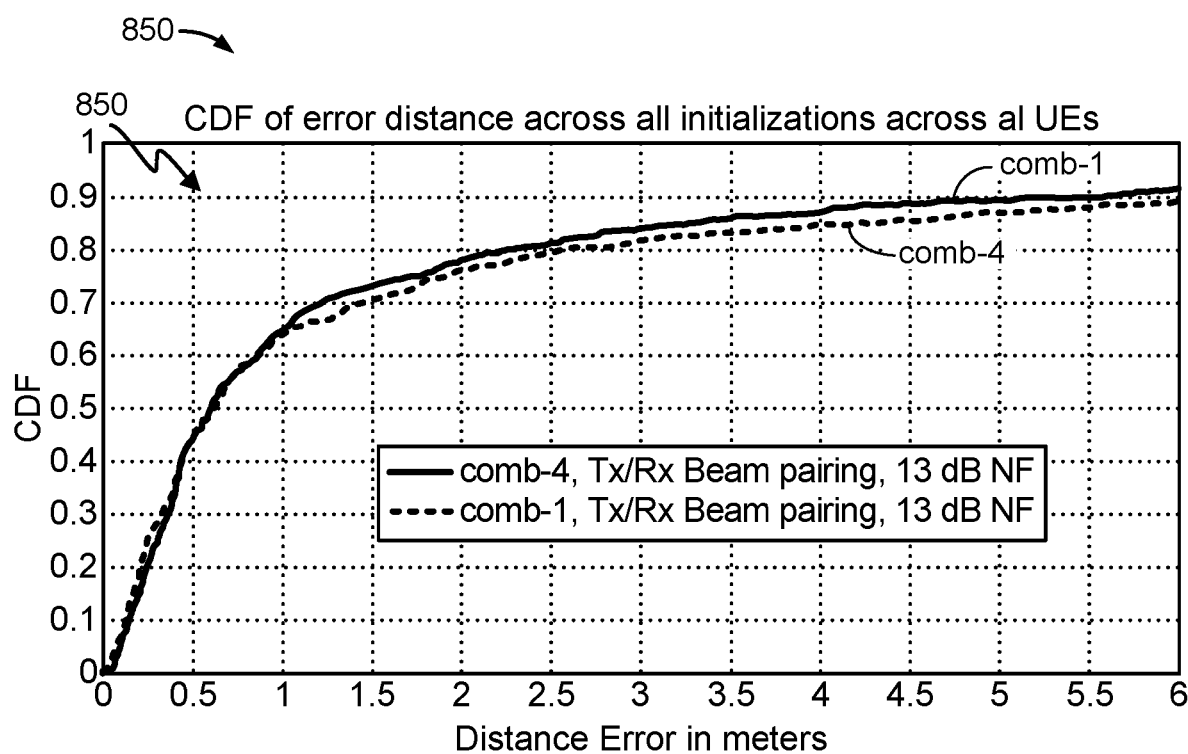

FIGS. 8A and 8B illustrate a performance comparison between comb-1 and comb-4. As used herein, the term "comb-N" indicates that 1 of every N subcarriers of a given bandwidth of a given symbol contain a PRS, without frequency staggering (i.e., all OFDM symbols carrying a PRS contain the PRS on the same subcarriers). It will be appreciated that for comb-1, each subcarrier of the transmission bandwidth contains a PRS, whereas with comb-4, 1 in every 4 subcarriers of the transmission bandwidth contain a PRS. In FIG. 8A, each shaded block represents resource elements/subcarriers containing a PRS. The diagram 810 of comb-1 (full comb) indicates that each subcarrier has a PRS that can be obtained by the UE. It will be appreciated that not all PRS have to be in the same OFDM symbol, but can be dispersed across various OFDM symbols. Regardless, the UE will have a PRS to be sampled in each subcarrier/tone.

In contrast, the diagram 820 of the comb-4 pattern (without additional frequency staggering) is illustrated with several resource elements/subcarriers that do not have a PRS to sample (e.g., empty blocks) and the PRS in every fourth subcarrier/tone. FIG. 8B is a graph 850 illustrating the performance differences between the comb-1 and comb-4 PRS configurations. It can be seen that performance loss appears in the tail of the cumulative distribution function (CDF) (after 60% percentile). Comb-4 has energy per resource element (EPRE) ratio of 6 dB. Although, the performance is better with the comb-1 configuration, it also increases the overhead and reduces the effective bandwidth of a given subframe, so there is an advantage to use less than all subcarriers in a subframe for PRS transmission.

Figure 9:
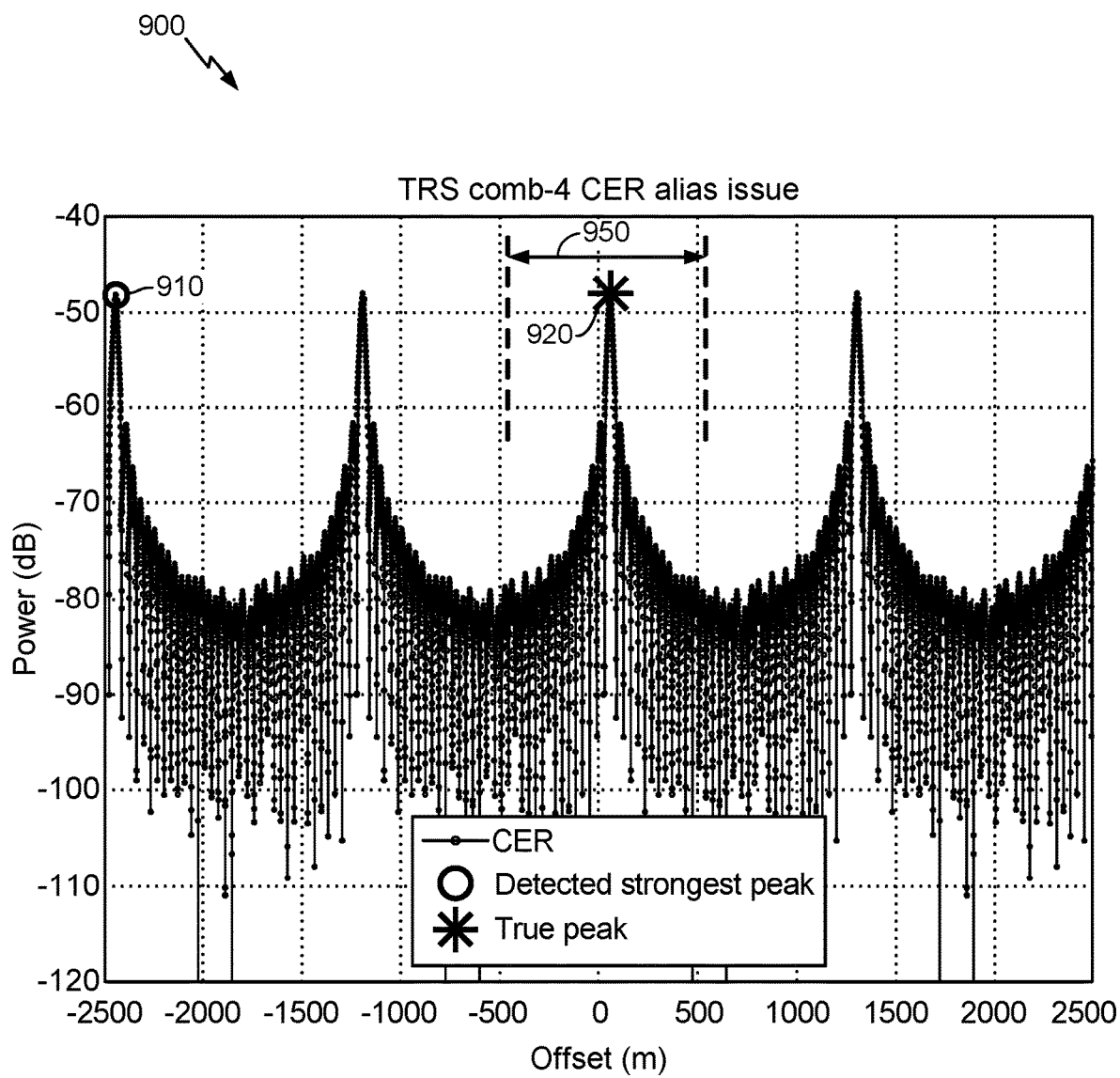
FIG. 9 is a graph illustrating a channel energy response (CER) and potential alias issue for subsampled subcarriers of a given bandwidth according to at least one aspect of the disclosure.

FIG. 9 is a graph 900 illustrating a comb-4 CER and potential alias issue. If cell is far away, there can be aliasing due to the frequency domain subsampling. For example, in the comb-4 PRS configuration, subsampling in the frequency domain results in the multiple peaks (four), as illustrated. A distance from each peak (x-axis in meters (m)) can be assumed based on the speed of light and time difference. As illustrated, there is approximately 1000 m between peaks. Also, as illustrated, the detected strongest peak 910, is an alias of the true peak 920. This can create an offset of 2500 m, as illustrated in the example of FIG. 9. Establishing an RSTD search window based on an estimated location of the UE could mitigate the aliasing problem, when a PRS configuration of less than comb-1 is used. For example, an RSTD search window 950 may be −2 μs to +2 μs around the 100 m position. Using the RSTD search window 950, the true peak 920 will be detected and the alias peak 910 would be discarded and the correct location will be identified. It will also be appreciated that the allowable RSTD search window is based on the PRS configuration and/or frequency range (e.g., FR1, FR2). If there is a PRS configuration that does not fully sample the frequency domain, then the allowable/maximum-size of the uncertainty window should be different to address the different PRS configuration. For example, if the allowable RSTD search window 950 was too large, it would not prevent detection of an alias peak (e.g. 910), so the allowable RSTD search window should be less than the peak to peak distance caused by the subsampling.

As discussed above, in LTE systems, a search window can be provided that is centered on the expected RSTD parameter and the search window size can be the expected RSTD uncertainty parameter. However, the RSTD search window uncertainty and resolution is constant in LTE. Both values together define a search window for the UE where the RSTD can be found. The expected RSTD is encoded in the LTE positioning protocol (LPP) as an integer value between −8192 and +8191 (14 bits). Therefore, the search window maximum range is −8192×3×$T_s$; +8191×3×T, with $T_s$=1/ (15000×2048) seconds, which results in a search window range of approximately −0.8 ms to +0.8 ms. This value range also supports "partially synchronized" PRS occasions (where the maximum offset between the transmitted PRS position occasions cannot exceed half a subframe (0.5 ms). For example, if $T_x$ is the reception time of the beginning of the subframe X of the assistance data reference cell at the target UE, the target UE may assume that the beginning of the closest subframe of a neighbor cell to subframe X is received within the search window of size [-expectedRSTD-Uncertainty×3×$T_s$, expectedRSTD-Uncertainty×3×$T_s$] centered at $T_x$. The uncertainty indicates the uncertainty of the expected RSTD and is related to the location server's a-priori estimate of the target UE location. However, this coarse range is not configurable and may help for subframe misalignment, but does not help for the frequency subsampling and symbol level aliasing, as discussed above and illustrated in FIG. 9.

For a different structure of a PRS, the allowable range of the RSTD search window may be different and therefore is configurable. For example, for a comb-12 PRS configuration without frequency domain staggering, the range of the search window and/or the resolution may be allowed to take only smaller values compared to the case where the PRS configuration is comb-N with N less than 12, or if there is frequency domain staggering, which can allow for PRS in all subcarriers. It will be appreciated that effectively the frequency domain staggering reduces to comb-1 PRS configuration, although not transmitted in a single symbol. Without frequency domain staggering, the PRS will only be available to be sampled in a subset of subcarriers for a given bandwidth in the frequency domain. Note that even if there is frequency staggering, PRS transmission on one or more subbands of a larger bandwidth would be an example of sampling a subset of subcarriers for a given bandwidth in the frequency domain.

LTE supports a single numerology (subcarrier spacing (15 kHz) and symbol length, etc.). In contrast NR may support multiple numerologies, for example, subcarrier spacing of 15 kHz, 30 kHz, 60 kHz, 120 kHz, and 240 kHz or greater may be available. Table 2 provided below lists some various parameters for different NR numerologies.

TABLE 2

| Sub-carrier spacing (kHz) | Symbols/slot | Slots/sub-frame | Slots/frame | Slot duration (ms) | Symbol duration (μs) | Max. nominal system BW (MHz) with 4K FFT size |
|---|---|---|---|---|---|---|
| 15 | 14 | 1 | 10 | 1 | 66.7 | 50 |
| 30 | 14 | 2 | 20 | 0.5 | 33.3 | 100 |
| 60 | 14 | 4 | 40 | 0.25 | 16.7 | 100 |
| 120 | 14 | 8 | 80 | 0.125 | 8.33 | 400 |
| 240 | 14 | 16 | 160 | 0.0625 | 4.17 | 800 |

In one example, if there is a given numerology with subcarrier spacing of 120 kHz, then in a 125 μs slot, 14 OFDM symbols can be fit. Given a comb-12 PRS configuration, the main peak will repeat every 1/12 of the symbols or 12 times in the time domain, which is every 125×1000/(14×12)=744 ns. The allowable range of the RSTD search window therefore should not exceed the size of 744 ns and would preferably be less. If the search window exceeded 744 ns, it could allow erroneous peaks. It will be appreciated that the subframe level uncertainty discussed above was on the order of 0.8 ms. In contrast, the allowable range of the RSTD search window, based on the PRS configuration above, is on the order of 700 ns. Accordingly, the subframe level uncertainty window would provide no advantage at preventing the symbol level aliasing. In general, for comb-N PRS configuration in a slot of size T ms, the allowable range of the RSTD search window should not be greater than T×1000/(14×N) ns.

Similarly, for a different comb-type PRS configuration, the resolution may be different than the fixed value provided in LTE (e.g., K×$T_s$, K=3) discussed above. As used herein, resolution related to the gap in unit of time between two consecutive values of the expected RSTD. For example, in LTE, the Resolution is 3*Ts because the expected RSTD is encoded in LPP as an integer value between −8192 and +8191 (14 bits) where, the search window maximum range is −8192×3×$T_s$; +8191×3×$T_s$ with $T_s$=1/(15000×2048) seconds, which results in a search window range of approximately −0.8 ms to +0.8 ms.

Generally, for a comb-N PRS configuration, where the allowable range of the RSTD search window is small, then the resolution is also a smaller value. The possible resolution values can be numerology dependent, i.e., for different numerologies, different values of resolution may be allowed. Additionally, the resolution may be calculated relative to $T_c$ to better address the NR numerologies. Throughout this specification, unless otherwise noted, the size of various fields in the time domain may be expressed in time units $T_c=1/(\Delta f_{max} \cdot N_f)$ where $\Delta f_{max}$=480·10³ Hz and $N_f$=4096. The constant k=$T_s/T_c$=64, where $T_s$=1/($\Delta f_{ref} \cdot N_{f,ref}$), $\Delta f_{ref}$=15·10³ Hz and $N_{f,ref}$=2048. In NR, higher accuracy may be needed and may be dependent on $T_c$=0.509 ns and the numerology factor. For example, the step size may be $T_c \cdot 2^u$, where "u" is one of 0, 1, 2, 3, 4, 5, 6. Generally, the resolution can be based on the numerology according to $K \cdot T_c \cdot 2^u$, where the value of K and u will generally decrease as the subcarrier spacing increases. Table 3 below provides values in ns for $K \cdot T_c \cdot 2^u$ for various values of K and u.

TABLE 3

| | | u | | | | | | |
|---|---|---|---|---|---|---|---|---|
| | | 0 | 1 | 2 | 3 | 4 | 5 | 6 |
| K | 1 | 0.509 | 1.017 | 2.035 | 4.069 | 8.138 | 16.276 | 32.552 |
| | 2 | 1.017 | 2.035 | 4.069 | 8.138 | 16.276 | 32.552 | 65.104 |
| | 3 | 1.526 | 3.052 | 6.104 | 12.207 | 24.414 | 48.828 | 97.656 |

For an NR numerology with subcarrier spacing of 15 kHz, it may be desirable to keep consistency with LTE. Accordingly, for 15 kHz, then K=3 and u=6, which results in the same value 97.656 ns as 3·$T_s$. However, for other NR numerology the values of u can vary. For example, with subcarrier spacing of greater than 15 kHz, K={1, 2, 3} and u={1, 2, 3, 4, 5}.

In some aspects, the adjustment of the allowable range of the RSTD search window may be also be associated with a refined positioning procedure/tracking positioning procedure, as it assumes there is available a coarse estimate to localize the UE to one of the aliasing repetitions produced by the comb-N PRS configuration. For example, if a coarse position estimate is known, this information can be used to limit the RSTD search window to be centered around the coarse position (e.g., 100 m position, discussed above in relation to FIG. 9). The coarse location along with the configurable RSTD search window may have an allowable range based on the PRS configuration, for example, the comb-type and numerology help to ensure that the true peak and thereby the true timing/location is detected.

In some additional aspects, the base station (e.g., gNB) may configure multiple {RSTD search window, Resolution}, or just {RSTD search window}, parameters. The gNB may signal (e.g., using downlink control information (DCI) or MAC control element (MAC-CE)) which RSTD search window to apply in a specific PRS configuration, or PRS occasion, or PRS occasion group. Aperiodic PRS or semi-persistent PRS can be allowed to be configured with different {RSTD search window, Resolution} or {RSTD search window} parameters, or multiple such options, whereas the periodic PRS may use the default specified values. These search windows may be configured to be sequential but need not be.

For example, Table 4 shows expected RSTD ranges and the differences in distance when the expectedRSTD parameter is encoded using 14 bits with a granularity of $3 \cdot T_c \cdot 2^{\mu_1}$, where $\mu_1 = 1,2,3,4,5,6$, $T_c = 0.509$ ns. Using 14 bits allows the expectedRSTD parameter to represent values from minus 8192 to 8192.

TABLE 4

| Configuration μ | ExpectedRSTD Range | Distance Differences |
|---|---|---|
| μ = 1 | [−25, 25] μs | 4.5 km |
| μ = 2 | [−50, 50] μs | 12 km |
| μ = 3 | [−100, 100] μs | 27 km |
| μ = 4 | [−200, 200] μs | 57 km |
| μ = 5 | [−400, 800] μs | 117 km |
| μ = 6 | [−800, 800] μs | 237 km |

As another example, Table 5 shows expected RSTD uncertainties and the differences in uncertainty distance when the expectedRSTD parameter is encoded using 10 bits with a granularity of $3 \cdot T_c \cdot 2^{\mu_2}$, where $\mu_2 = 1,2,3,4,5,6$, $T_c = 0.509$ ns. Using 10 bits allows the expectedRSTD parameter to represent values from minus 0 to 1023.

TABLE 5

| Configuration μ | Min ExpectedRSTD-Uncertainty | Max ExpectedRSTD-Uncertainty | Uncertainty Distance Differences |
|---|---|---|---|
| μ = 1 | 3 ns | 3.12 μs | 0.93 km |
| μ = 2 | 6.1 ns | 6.24 μs | 1.87 km |
| μ = 3 | 12.2 ns | 12.49 μs | 3.75 km |
| μ = 4 | 24.4 ns | 24.99 μs | 7.5 km |
| μ = 5 | 38.9 ns | 49.98 μs | 15 km |
| μ = 6 | 97.7 ns | 99.97 μs | 30 km |

In an aspect, the size of the RSTD search window may depend on the frequency band (or subband). In an aspect, each frequency band may have a different size search window. However, frequency bands that overlap may be allowed to have the same values. In an aspect, the parameters for each search window may be selected from Tables 5 and 6 above. For example, one frequency band (e.g., 28 GHz, referred to as "n257") may have a configuration μ=3, a minimum expectedRSTD-Uncertainty of 12.2 ns, a maximum expectedRSTD-Uncertainty of 12.49 μs, and an uncertainty distance difference of 3.75 km. A second frequency band (e.g., the "n41" band) may have a configuration μ=6, a minimum expectedRSTD-Uncertainty of 97.7 ns, a maximum expectedRSTD-Uncertainty of 99.97 μs, and an uncertainty distance difference of 30 km. In the same example, the first frequency band may have a configuration μ=0, an expectedRSTD range of [42.5, 12.5] μs, and a distance difference of 3.75 km. The second frequency band may have a configuration μ=3, an expectedRSTD range of [−100, 100] μs, and a distance difference of 27 km.

In an aspect, the size of the RSTD search window may depend on the frequency range (e.g., FR1, FR2). In an aspect, each frequency range may have a different size search window having different parameters from other search windows. The parameters for each search window may be selected from Tables 5 and 6 above. For example, one frequency range (e.g., FR2) may have a configuration μ=3, a minimum expectedRSTD-Uncertainty of 12.2 ns, a maximum expectedRSTD-Uncertainty of 12.49 μs, and an uncertainty distance difference of 3.75 km. A second frequency range (e.g., FR1) may have a configuration μ=6, a minimum expectedRSTD-Uncertainty of 97.7 ns, a maximum expectedRSTD-Uncertainty of 99.97 μs, and an uncertainty distance difference of 30 km. In the same example, the first frequency range (e.g., FR2) may have a configuration μ=0, an expectedRSTD range of [−12.5, 12.5] μs, and a distance difference of 3.75 km. The second frequency range (e.g., FR1) may have a configuration μ=3, an expectedRSTD range of [−100, 100] μs, and a distance difference of 27 km. Note that FR2 is a power of two scaled down version of FR1. In the example above, it is ⅛.

Figure 10:
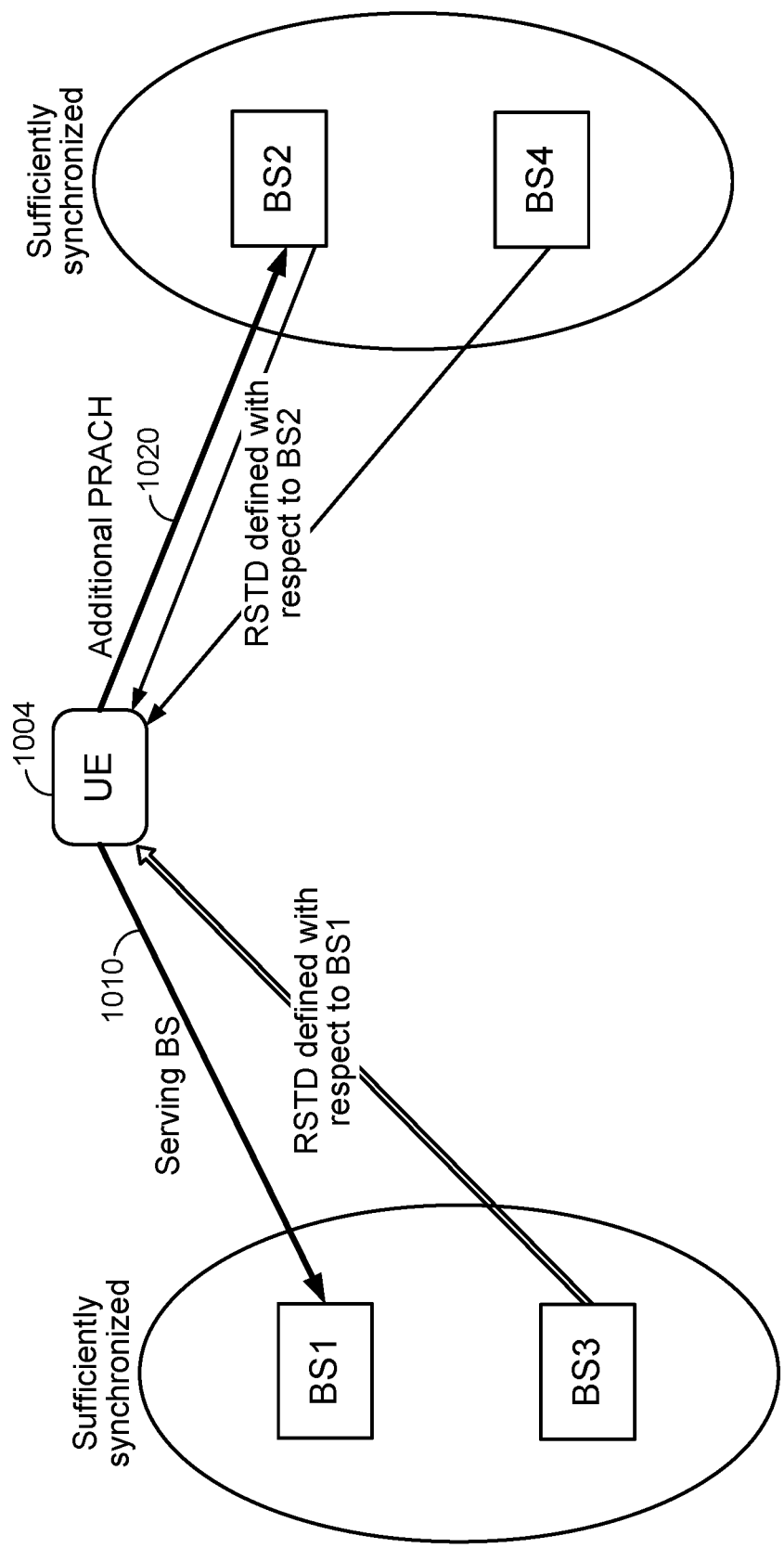
FIG. 10 illustrates defining an RSTD search window with respect to an alternate base station and not a serving base station according to at least one aspect of the disclosure.

FIG. 10 illustrates another aspect of the disclosure, which includes defining the RSTD search window with respect to an alternate base station and not a serving base station. The RSTD search window is based on the uncertainty of the timing of a base station with respect to a reference base station/node (generally a serving base station). However, if the base stations are not synchronized, or are insufficiently synchronized, then the RSTD search window/uncertainty window would be mainly affected by the timing uncertainty between the two base stations, and may not be able to be decreased a significant amount. As an example of sufficiently synchronized base stations, two base stations would need to be within 3 us for FR2 and 10 us for FR1 to be considered sufficiently synchronized. NR is being separated into two different frequency ranges. For example, FR1 includes sub-6 GHz frequency bands, and 1-R2 includes frequency bands in the mmWave range. However, these values may vary depending on the specific network configuration, transmission frequencies, etc. For example, this may be related to the positioning operation in LTE dual-connectivity or other multi-RAT configurations assuming all positioning procedures are run independently in each cell-group and the two cell-groups are not well synchronized with respect to each other.

As illustrated in FIG. 10, BS1 is the serving base station. Accordingly, the UE 1004 has performed PRACH procedure 1010 with BS1 and it obeys the timing advance (TA) commands with respect to the specific base station. Further, as illustrated, assume that there are two neighboring base stations (BS2 and BS3) such that BS2 is not synchronized or is insufficiently synchronized with respect to BS1, but BS3 is sufficiently synchronized with respect to BS1. For BS3, the RSTD search window can be defined with respect to BS1. However, to address this insufficient synchronization with respect to BS2, the UE 1004 can be configured to perform an additional PRACH 1020 with the insufficiently synchronized neighboring base station (BS2), which then becomes an alternate base station or alternate node to act as a reference. The RSTD search window can be defined with respect to the PRACH timing from that alternate base station/alternate node, i.e., BS2 in the example of FIG. 10. The RSTD search window can now be adjusted with respect to BS2 for each base station sufficiently synchronized with BS2. For example, as illustrated, BS4 is sufficiently synchronized with BS2, but not with BS1 (or BS3). In this case, the RSTD search window for BS4 can be defined with respect to the BS2 and can be useful for RSTD measurements between BS2 and BS4.

In an aspect, instead of picking round microsecond (μs) numbers, the search space values for the RSTD search window could also be aligned based on OFDM symbol lengths. In the symbol-aligned case for FR1, a symbol duration including a CP of 60 kHz subcarrier spacing (SCS): $1e6*(144+2048)/(2048*15e3)/4=17.8385$ μs can be used. A search space offset of [−107.0313, 107.0313] could be supported by a total of 13 symbol offset hypotheses {−6, −5, −4, −3, −2, −1, 0, 1, 2, 3, 4, 5, 6}. Supporting an additional approximately 50 μs of the search space in addition to the offset would use three symbols, or approximately 53.3 μs. In all, an SCS of 60 kHz in FR1 could be supported with a total of 19 symbol hypotheses: {−9, −8, −7, −6, −5, −4, −3, −2, −1, 0, 1, 2, 3, 4, 5, 6, 7, 8, 9}. That is, the total covered range would be [−160.5469, 160.5469] μs, or approximately ±48 km.

Similarly, for FR2, for a 120 kHz symbol duration, 1e6*(144+2048)/(2048*15e3)/8=8.9193 μs. In this case, a symbol offset of {−2, −1, 0, 1, 2} would support a search offset range of [−17.8385 17.8385] μs. Adding a search window of ±1 symbol, or 8.9 μs, would mean that seven symbol hypotheses {−3, −2, −1, 0, 1, 2, 3} would cover a range of ±3*8.9193 μs=[−26.7578, 26.7578] μs or ±8.02 km.

As a specific example for FR1, assume an expectedRSTD of [−107.0, 107.0] μs, an expectedRSTD-Uncertainty of [−53.5, 53.5] μs, a range of supported search spaces in μs for all TRPs of [−160.5, 160.5], a range of supported search spaces in km for all TRPs of [−48.1, 48.1], and a largest supported distance between any TRPs used in the same positioning session of 31.2 km. For an SCS of 60 kHz (the designed SCS), the search window offset options per cell per occasion may be 13 symbol offsets {−6, −5, −4, −3, −2, −1, 0, 1, 2, 3, 4, 5, 6}, corresponding to [−107.0, 107.0] μs. The search window size per cell per occasion may be seven offsets total {−3, −2, −1, 0, 1, 2, 3}, corresponding to [−53.5, 53.5] μs. The full search range for all cells per positioning session may be 19 offsets total {−9, −8, −7, −6, −5, −4, −3, −2, −1, 0, 1, 2, 3, 4, 5, 6, 7, 8, 9}, corresponding to [−160.5, 160.5] μs.

Continuing to refer to the specific FR1 example above, for an SCS of 30 kHz (derived from 60 kHz SCS), the search window offset options per cell per occasion may be seven symbol offsets {−3, −2, −1, 0, 1, 2, 3}, corresponding to [−107.0, 107.0] μs. The search window size per cell per occasion may be five offsets total {−2, −1, 0, 1, 2}, corresponding to [−71.4, 71.4] μs. The full search range for all cells per positioning session may be 11 offsets total {−5, −4, −3, −2, −1, 0, 1, 2, 3, 4, 5}, corresponding to [−178.4, 178.4] μs. Note that for 30 kHz SCS, a symbol is double the duration of a symbol for 60 KHz SCS. Thus, six symbols for 60 kHz SCS has the same duration as three symbols for 30 KHz SCS.

Continuing to refer to the specific FR1 example above, for an SCS of 15 kHz (derived from 60 kHz SCS), the search window offset options per cell per occasion may be 5 symbol offsets {−2, −1, 0, 1, 2}, corresponding to [−142.7, 142.7] μs. The search window size per cell per occasion may be three offsets total {−1, 0, 1}, corresponding to [−71.4, 71.4] μs. The full search range for all cells per positioning session may be seven offsets total {−3, −2, −1, 0, 1, 2, 3}, corresponding to [−214.1, 214.1] μs. Note that five total offsets could be used for 15 kHz SCS because each hypothesis spans [−0.5, 0.5] symbols. Note that 2.5 symbols is 178.4 μs to 160.5 μs.

As a specific example for FR2, assume an expectedRSTD of [−13.3789, 13.3789] μs, an expectedRSTD-Uncertainty of [−13.3789, 13.3789] μs, a range of supported search spaces in us for all TRPs of [−26.7578, 26.7578], a range of supported search spaces in km for all TRPs of [−8.02, 8.02], and a largest supported distance between any TRPs used in the same positioning session of 8.02 km. For an SCS of 240 kHz (the designed SCS), the search window offset options per cell per occasion may be seven symbol offsets {−3, −2, −1, 0, 1, 2, 3}, corresponding to [−13.4, 13.4] μs. The search window size per cell per occasion may be seven offsets total {−3, −2, −1, 0, 1, 2, 3}, corresponding to [−13.4, 13.4] μs. The full search range for all cells per positioning session may be 13 offsets total {−6, −5, −4, −3, −2, −1, 0, 1, 2, 3, 4, 5, 6}, corresponding to [−26.8, 26.8] μs.

Continuing to refer to the specific FR2 example above, for an SCS of 104 kHz (derived from 240 kHz SCS), the search window offset options per cell per occasion may be five symbol offsets {−2, −1, 0, 1, 2}, corresponding to [47.8, 17.8] μs. The search window size per cell per occasion may be five offsets total {−2, −1, 0, 1, 2}, corresponding to [−17.8, 17.8] μs. The full search range for all cells per positioning session may be seven offsets total {−4, −3, −2, −1, 0, 1, 2, 3, 4}, corresponding to [−26.8, 26.8] μs.

Continuing to refer to the specific FR2 example above, for an SCS of 60 kHz (derived from 240 kHz SCS), the search window offset options per cell per occasion may be 3 symbol offsets {−1, 0, 1}, corresponding to [−17.8, 17.8] μs. The search window size per cell per occasion may be three offsets total {−1, 0, 1}, corresponding to [−17.8, 17.8] μs. The full search range for all cells per positioning session may be five offsets total {−2, −1, 0, 1, 2}, corresponding to [−35.7, 35.7] μs.

As briefly mentioned above, in NR, frequency bands can overlap, i.e., collide, in frequency. For example, in FIG. 11, band n77 ranges between 3300 MHz (3.3 GHz) and 4200 MHz (4.2 GHz) for a bandwidth of 900 MHz. Also, band n78 ranges between and 3800 MHz (3.8 GHz) for a bandwidth of 500 MHz. In other words, the entirety of band n78 collides with band n77. FIG. 12 shows some FR1 and FR2 bands and their overlaps For example, in FR1, band n1 overlaps, at least partially, with bands n2, n25, and n66, and fully overlaps with band n84. As another example, in FR2, band n257 partially overlaps with band n258 and fully overlaps with band n261.

Figure 13:
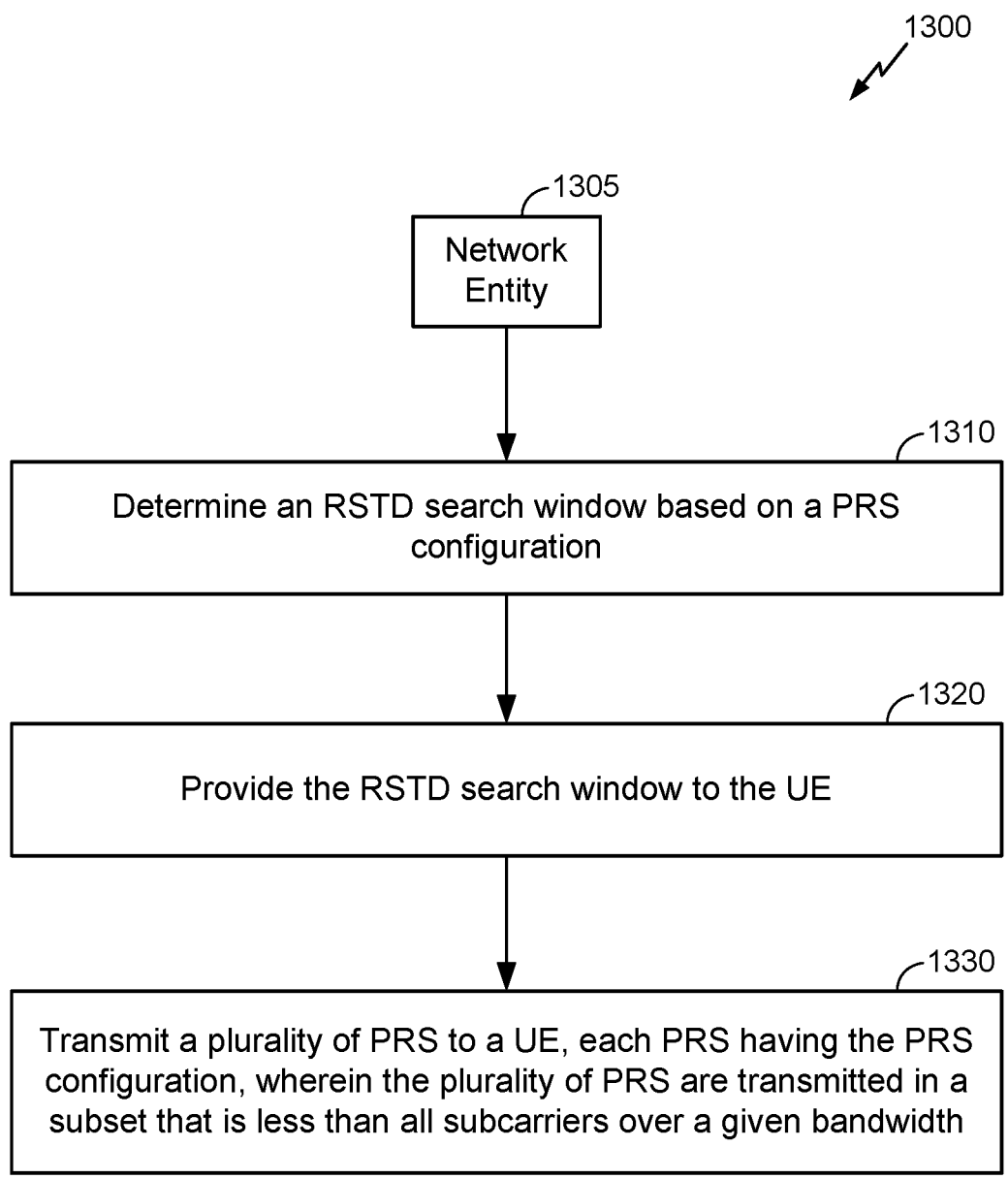
FIG. 13 illustrates a method of operating a network entity according to at least one aspect of the disclosure.

FIG. 13 illustrates a method 1300 of operating a network entity 1305, according to aspects of the disclosure. It will be appreciated that the network entity 1305 may be any network element or combinations of network elements capable of performing the functional aspects described. For example, the network entity 1305 may be a base station 102 (and variations noted above), a location server 230 or LMF 270, or a combination of the base station and location server. The method 1300 includes, at block 1310, configuring an RSTD search window based on a PRS configuration (and/or frequency range (e.g., FR1, FR2)). At block 1320, the RSTD search window is provided to a UE. The RSTD search window may be provided as part of OTDOA assistance information provided to the UE. At 1330, the method 1300 includes transmitting a plurality of PRS to the UE, each PRS having the PRS configuration. The PRS may be transmitted in a subset that is less than all subcarriers over a given bandwidth.

Generally, as discussed above, for a different structure of a reference signal for positioning, the allowable range of the search window may be different. For example, the allowable range for comb-N PRS configuration is greater than the allowable range for comb-M PRS configuration and wherein N is less than M and N is greater than 1. It will be appreciate that as N increases, the allowable range will decrease.

Figure 14:
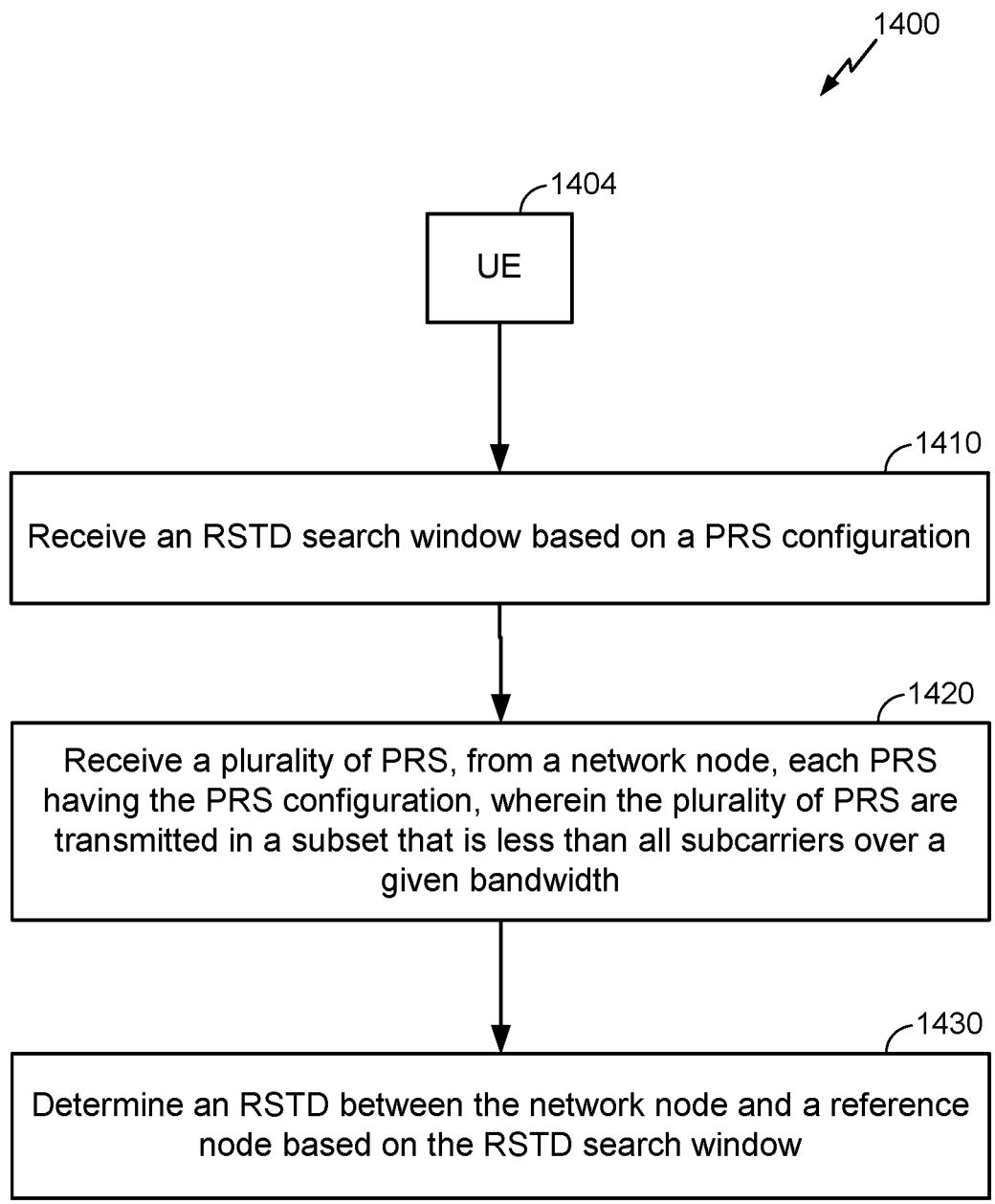
FIG. 14 illustrates a method of operating a UE according to at least one aspect of the disclosure.

FIG. 14 illustrates a method 1400 of operating a UE 1404 (e.g., any of the UEs described herein), according to aspects of the disclosure. At block 1410, an RSTD search window (having an allowable range) based on a PRS configuration (and/or frequency range (e.g., FR1, FR2)) is received from a network node. At block 1420, a plurality of PRS is received from the network node, each having the PRS configuration. The PRS may be transmitted in a subset that is less than all subcarriers over a given bandwidth. At block 1430, an RSTD between the network node and a reference node is determined based on the RSTD search window. It will be appreciated that the network node and the reference node may each one of a base station, access point, or transmission points belonging to a same base station, as discussed herein. Once the RSTD is determined, the UE can report the RSTD to a network entity (e.g., base station, location server, etc.) and/or use the RSTD to determine the location of the UE, for UE based positioning. In other aspects, the UE can determine the network node is insufficiently synchronized with a reference node serving the UE, such as discussed above in relation to FIG. 10. For example, a serving base station can send information related to the synchronization abilities of other base stations in the vicinity. Once identified, to address the RSTD search window and assistance data from the insufficiently synchronized network node, the UE can perform a PRACH procedure with an alternate node, wherein the RSTD search window is referenced to the alternate node to which the network node is sufficiently synchronized.

Figure 15:
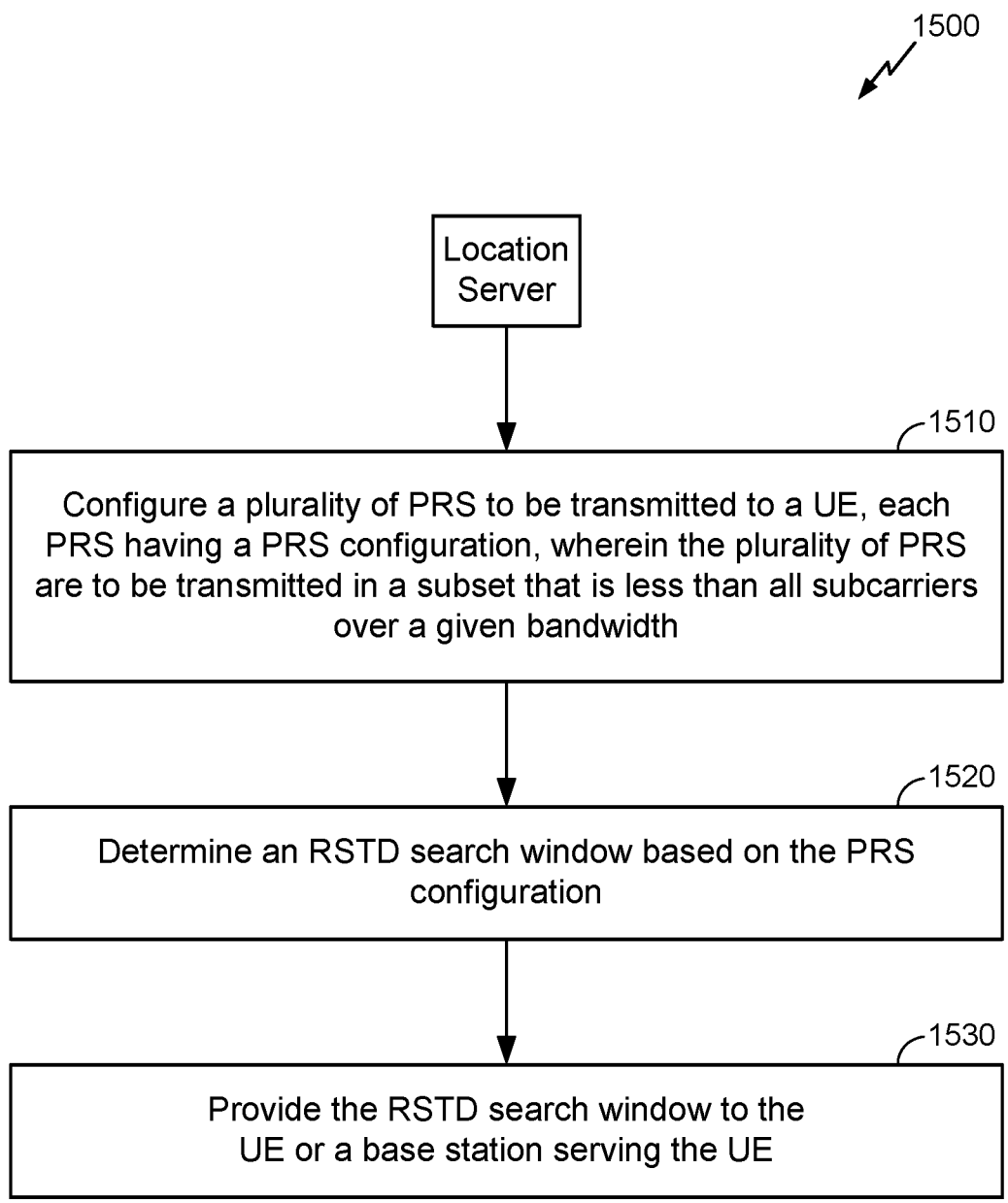
FIG. 15 illustrates a method of operating a location server according to at least one aspect of the disclosure.

FIG. 15 illustrates a method 1500 of operating a location server, according to aspects of the disclosure. At block 1510, the location server determines an RSTD search window based on a PRS configuration (and/or frequency range (e.g., FR1, FR2)). At block 1520, the location server provides the RSTD search window to a UE or a base station serving the UE. At block 1530, the location server configures a plurality of PRS to be transmitted to the UE, each PRS having the PRS configuration, wherein the PRS are to be transmitted in a subset that is less than all subcarriers over a given bandwidth.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable read-only memory (EPROM), electronically erasable programmable read-only memory (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying a method as described herein.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of operating a network entity, comprising:
    obtaining a reference signal timing difference (RSTD) search window based on a positioning reference signal (PRS) configuration, wherein the RSTD search window is defined by an expected RSTD parameter and an RSTD uncertainty parameter, wherein the RSTD is search window has an allowable range based on the PRS configuration, and wherein a different size of the RSTD search window is determined for each frequency range associated with the PRS configuration;
    providing the RSTD search window to a user equipment (UE); and
    transmitting a plurality of PRS defined by the PRS configuration to the UE, wherein the plurality of PRS is transmitted in a subset of subcarriers that is less than all subcarriers over a given bandwidth.

2. The method of claim 1, wherein the allowable range for a comb-N PRS configuration is greater than the allowable range for a comb-M PRS configuration, and wherein N is less than M.

3. The method of claim 2, wherein N is greater than 1.

4. The method of claim 1, wherein the allowable range is inversely proportional to a comb-N PRS configuration without frequency staggering.

5. The method of claim 1, wherein the allowable range is on an order of nanoseconds (ns).

6. The method of claim 1, wherein the allowable range is based on a numerology of the PRS configuration.

7. The method of claim 6, wherein the allowable range is not greater than T·1000/(14·N) ns, where T is a slot size in microseconds (μs), and wherein the PRS configuration is of comb-N.

8. The method of claim 1, wherein obtaining the RSTD search window based on the PRS configuration comprises:
obtaining a different RSTD search window for each frequency range associated with the PRS configuration.

9. The method of claim 1, wherein a resolution value for the RSTD search window is $K \cdot T_c \cdot 2^u$, where $T_c=1/(480,000 \cdot 4096)$ and wherein $K=\{1, 2, 3\}$ and $u=\{1, 2, 3, 4, 5, 6\}$.

10. The method of claim 9, wherein selected values of K or u are based on a numerology of the PRS configuration.

11. The method of claim 10, wherein K=3 and u=6 based on the numerology having a 15 kilohertz (kHz) subcarrier spacing.

12. The method of claim 10, wherein K is selected from integers 1, 2, or 3 with u less than 6 for any numerology having a subcarrier spacing greater than 15 kHz.

13. The method of claim 9, wherein selected values of K or u are configured.

14. The method of claim 9, wherein the expected RSTD parameter is encoded using 14 bits with a granularity $3 \cdot T_c \cdot 2^{u_1}$, where $u_1=\{1, 2, 3, 4, 5, 6\}$ and $T_c$ is 0.509 nanoseconds.

15. The method of claim 9, wherein the RSTD uncertainty parameter is encoded using 10 bits with a granularity $3 \cdot T_c \cdot 2^{u_2}$, where $u_2=\{1, 2, 3, 4, 5, 6\}$ and $T_c$ is 0.509 nanoseconds.

16. The method of claim 15, wherein u1 and u2 are different.

17. The method of claim 1, wherein providing the RSTD search window further comprises:
configuring multiple RSTD search windows with multiple allowable ranges; and
providing the multiple RSTD search windows with the multiple allowable ranges to the UE.

18. The method of claim 17, wherein at least one of the multiple RSTD search windows is associated with a resolution.

19. The method of claim 17, further comprising:
signaling to the UE which one of the multiple RSTD search windows to apply to a PRS configuration, a PRS occasion, a PRS instance, or a PRS occasion group.

20. The method of claim 19, wherein the UE is signaled using downlink control information (DCI) or medium access control (MAC) control element (CE).

21. The method of claim 17, further comprising:
receiving a report from the UE reporting RSTDs determined for the multiple RSTD search windows.

22. The method of claim 17, wherein a different RSTD search window of the multiple RSTD search windows is configured for each frequency band on which the UE is expected to measure the plurality of PRS.

23. The method of claim 17, wherein a different RSTD search window of the multiple RSTD search windows is configured for each frequency range in which the UE is expected to measure the plurality of PRS.

24. The method of claim 1, wherein the PRS configuration is aperiodic PRS or semi-persistent PRS.

25. The method of claim 1, further comprising:
obtaining a position estimate of the UE, wherein an accuracy of the position estimate is less than aliasing repetitions produced by a comb-N PRS configuration.

26. The method of claim 25, wherein the position estimate of the UE is obtained while tracking the UE.

27. The method of claim 1, wherein the network entity is insufficiently synchronized with a serving base station of the UE, and wherein the RSTD search window is referenced to an alternate base station to which the network entity is sufficiently synchronized.

28. The method of claim 27, wherein the UE is configured to perform a physical random access channel (PRACH) procedure with the alternate base station.

29. The method of claim 1, wherein the network entity is a base station.

30. The method of claim 29, wherein the obtaining comprises receiving the RSTD search window from a location server.

31. The method of claim 29, wherein the obtaining comprises configuring the RSTD search window at the base station.

32. The method of claim 1, wherein the RSTD search window is provided as part of downlink positioning reference signal assistance information, and
wherein a size of the RSTD search window is provided in the downlink positioning reference signal assistance information as a number of one or more orthogonal frequency division multiplexing (OFDM) symbols.

33. The method of claim 32, wherein the number of the one or more OFDM symbols is based on a frequency range in which the UE is expected to measure the plurality of PRS.

34. The method of claim 32, wherein each of a search window offsets per cell per occasion parameter, a search window size per cell per occasion, and a full search range for all cells per positioning session parameter are represented by a number of one or more OFDM symbols.

35. The method of claim 1, wherein:
the frequency range of the plurality of PRS is Frequency Range 1 (FR1), and a value of the RSTD uncertainty parameter is +/−32 microseconds.

36. The method of claim 1, wherein:
the frequency range of the plurality of PRS is Frequency Range 2 (FR2), and a value of the RSTD uncertainty parameter is +/−8 microseconds.

37. A method of operating a user equipment (UE), comprising:
receiving a reference signal timing difference (RSTD) search window based on a positioning reference signal (PRS) configuration, wherein the RSTD search window is defined by an expected RSTD parameter and an RSTD uncertainty parameter, wherein the RSTD search window has an allowable range based on the PRS configuration, and wherein a different size of the RSTD search window is determined for each frequency range associated with the PRS configuration;
receiving a plurality of PRS defined by the PRS configuration from a network node, wherein the plurality of PRS is transmitted in a subset of subcarriers that is less than all subcarriers over a given bandwidth; and
determining an RSTD between the network node and a reference node based on the RSTD search window.

38. The method of claim 37, wherein the allowable range for a comb-N PRS configuration is greater than the allowable range for a comb-M PRS configuration, and wherein N is less than M.

39. The method of claim 38, wherein N is greater than 1.

40. The method of claim 37, wherein the allowable range is inversely proportional to a comb-N PRS configuration without frequency staggering.

41. The method of claim 37, wherein the allowable range is on an order of nanoseconds (ns).

42. The method of claim 37, wherein the allowable range is based on a numerology of the PRS configuration.

43. The method of claim 42, wherein the allowable range is not greater than T·1000/(14·N) ns, where T is a slot size in microseconds (μs), and wherein the PRS configuration is of comb-N.

44. The method of claim 37, wherein a different RSTD search window is determined for each frequency range associated with the PRS configuration.

45. The method of claim 37, wherein a resolution value for the RSTD search window is $K \cdot T_c \cdot 2^u$, where $T_c=1/(480,000 \cdot 4096)$ and wherein $K=\{1, 2, 3\}$ and $u=\{1, 2, 3, 4, 5, 6\}$.

46. The method of claim 45, wherein selected values of K or u are based on a numerology of the PRS configuration.

47. The method of claim 46, wherein K=3 and u=6 based on the numerology having a 15 kilohertz (kHz) subcarrier spacing.

48. The method of claim 46, wherein K is selected from integers 1, 2, or 3 with u less than 6 for any numerology having a subcarrier spacing greater than 15 kHz.

49. The method of claim 45, wherein selected values of K or u are configured.

50. The method of claim 45, wherein the expected RSTD parameter is encoded using 14 bits with a granularity $3 \cdot T_c \cdot 2^{u_1}$, where $u_1=\{1, 2, 3, 4, 5, 6\}$ and $T_c$ is 0.509 nanoseconds.

51. The method of claim 45, wherein the RSTD uncertainty parameter is encoded using 10 bits with a granularity $3 \cdot T_c \cdot 2^{u_2}$, where $u_2=\{1, 2, 3, 4, 5, 6\}$ and $T_c$ is 0.509 nanoseconds.

52. The method of claim 51, wherein u1 and u2 are different.

53. The method of claim 37, wherein receiving the RSTD search window further comprises:
receiving multiple RSTD search windows with multiple allowable ranges.

54. The method of claim 53, wherein at least one of the multiple RSTD search windows is associated with a resolution.

55. The method of claim 53, further comprising:
receiving which one of the multiple RSTD search windows to apply to a PRS configuration, a PRS occasion, a PRS instance, or a PRS occasion group.

56. The method of claim 55, wherein the UE is signaled using downlink control information (DCI) or medium access control (MAC) control element (CE).

57. The method of claim 53, further comprising:
transmitting a report to the network node reporting RSTDs determined for the multiple RSTD search windows.

58. The method of claim 53, wherein a different RSTD search window of the multiple RSTD search windows is configured for each frequency band on which the UE is expected to measure the plurality of PRS.

59. The method of claim 53, wherein a different RSTD search window of the multiple RSTD search windows is configured for each frequency range in which the UE is expected to measure the plurality of PRS.

60. The method of claim 37, wherein the PRS configuration is aperiodic PRS or semi-persistent PRS.

61. The method of claim 37, wherein the network node is insufficiently synchronized with a serving base station of the UE, and wherein the RSTD search window is referenced to an alternate base station to which the network node is sufficiently synchronized.

62. The method of claim 61, further comprising performing a physical random access channel (PRACH) procedure with the alternate base station.

63. The method of claim 37, wherein the network node is a base station.

64. The method of claim 63, wherein the receiving comprises receiving the RSTD search window from a location server via the base station.

65. The method of claim 37, wherein the RSTD search window is received as part of downlink positioning reference signal assistance information, and
wherein a size of the RSTD search window is received in the downlink positioning reference signal assistance information as a number of one or more orthogonal frequency division multiplexing (OFDM) symbols.

66. The method of claim 65, wherein the number of the one or more OFDM symbols is based on a frequency range in which the UE is expected to measure the plurality of PRS.

67. The method of claim 65, wherein each of a search window offsets per cell per occasion parameter, a search window size per cell per occasion, and a full search range for all cells per positioning session parameter are represented by a number of one or more OFDM symbols.

68. The method of claim 37, further comprising:
reporting the RSTD to a network entity.

69. The method of claim 68, wherein the network entity is a base station or a location server.

70. The method of claim 37, further comprising:
determining a location of the UE, at the UE, using the RSTD.

71. The method of claim 37, wherein the network node and the reference node are each one of a base station, access point, or transmission points belonging to a same base station.

72. The method of claim 37, wherein:
the frequency range of the plurality of PRS is Frequency Range 1 (FR1), and a value of the RSTD uncertainty parameter is +/−32 microseconds.

73. The method of claim 37, wherein:
the frequency range of the plurality of PRS is Frequency Range 2 (FR2), and a value of the RSTD uncertainty parameter is +/−8 microseconds.

74. A method of operating a location server, comprising:
determining a reference signal timing difference (RSTD) search window based on a positioning reference signal (PRS) configuration, wherein the RSTD search window is defined by an expected RSTD parameter and an RSTD uncertainty parameter, wherein the RSTD search window has an allowable range based on the PRS configuration, and wherein a different size of the RSTD search window is determined for each frequency range associated with the PRS configuration;
providing the RSTD search window to a user equipment (UE) via a base station serving the UE; and
configuring a plurality of PRS defined by the PRS configuration to be transmitted to the UE, wherein the plurality of PRS is to be transmitted in a subset of subcarriers that is less than all subcarriers over a given bandwidth.

75. The method of claim 74, wherein the allowable range for a comb-N PRS configuration is greater than the allowable range for a comb-M PRS configuration, and wherein N is less than M.

76. The method of claim 75, wherein N is greater than 1.

77. The method of claim 74, wherein the allowable range is inversely proportional to a comb-N PRS configuration without frequency staggering.

78. The method of claim 74, wherein the allowable range is on an order of nanoseconds (ns).

79. The method of claim 74, wherein the allowable range is based on a numerology of the PRS configuration.

80. The method of claim 79, wherein the allowable range is not greater than T·1000/(14·N) ns, where T is a slot size in microseconds (µs), and wherein the PRS configuration is of comb-N.

81. The method of claim 74, wherein determining the RSTD search window based on the PRS configuration comprises:
determining a different RSTD search window for each frequency range associated with the PRS configuration.

82. The method of claim 74, wherein a resolution value for the RSTD search window is $K \cdot T_c \cdot 2^u$, where $T_c = 1/(480{,}000 \cdot 4096)$ and wherein $K=\{1, 2, 3\}$ and $u=\{1, 2, 3, 4, 5, 6\}$.

83. The method of claim 82, wherein selected values of K or u are based on a numerology of the PRS configuration.

84. The method of claim 83, wherein K=3 and u=6 based on the numerology having a 15 kilohertz (kHz) subcarrier spacing.

85. The method of claim 83, wherein K is selected from integers 1, 2, or 3 with u less than 6 for any numerology having a subcarrier spacing greater than 15 kHz.

86. The method of claim 82, wherein selected values of K or u are configured.

87. The method of claim 82, wherein the expected RSTD parameter is encoded using 14 bits with a granularity $3 \cdot T_c \cdot 2^{u_1}$, where $u_1=\{1, 2, 3, 4, 5, 6\}$ and T is 0.509 nanoseconds.

88. The method of claim 82, wherein the RSTD uncertainty parameter is encoded using 10 bits with a granularity $3 \cdot T_c \cdot 2^{u_2}$, where $u_2=\{1, 2, 3, 4, 5, 6\}$ and T is 0.509 nanoseconds.

89. The method of claim 88, wherein u1 and u2 are different.

90. The method of claim 74, wherein providing the RSTD search window further comprises:
configuring multiple RSTD search windows with multiple allowable ranges; and
providing the multiple RSTD search windows with the multiple allowable ranges to the UE via the base station.

91. The method of claim 90, wherein at least one of the multiple RSTD search windows is associated with a resolution.

92. The method of claim 90, further comprising:
signaling to the UE which one of the multiple RSTD search windows to apply to a PRS configuration, a PRS occasion, a PRS instance, or a PRS occasion group.

93. The method of claim 92, wherein the UE is signaled using downlink control information (DCI) or medium access control (MAC) control element (CE).

94. The method of claim 90, further comprising:
receiving a report from the UE reporting RSTDs determined for the multiple RSTD search windows.

95. The method of claim 90, wherein a different RSTD search window of the multiple RSTD search windows is configured for each frequency band on which the UE is expected to measure the plurality of PRS.

96. The method of claim 90, wherein a different RSTD search window of the multiple RSTD search windows is configured for each frequency range in which the UE is expected to measure the plurality of PRS.

97. The method of claim 74, wherein the PRS configuration is aperiodic PRS or semi-persistent PRS.

98. The method of claim 74, further comprising:
obtaining a position estimate of the UE, wherein an accuracy of the position estimate is less than aliasing repetitions produced by a comb-N PRS configuration.

99. The method of claim 98, wherein the position estimate of the UE is obtained while tracking the UE.

100. The method of claim 74, wherein the RSTD search window is provided as part of downlink positioning reference signal assistance information, and
wherein a size of the RSTD search window is provided in the downlink positioning reference signal assistance information as a number of one or more orthogonal frequency division multiplexing (OFDM) symbols.

101. The method of claim 100, wherein the number of the one or more OFDM symbols is based on a frequency range in which the UE is expected to measure the plurality of PRS.

102. The method of claim 100, wherein each of a search window offsets per cell per occasion parameter, a search window size per cell per occasion, and a full search range for all cells per positioning session parameter are represented by a number of one or more OFDM symbols.

103. The method of claim 74, wherein:
the frequency range of the plurality of PRS is Frequency Range 1 (FR1), and a value of the RSTD uncertainty parameter is +/−32 microseconds.

104. The method of claim 74, wherein:
the frequency range of the plurality of PRS is Frequency Range 2 (FR2), and a value of the RSTD uncertainty parameter is +/−8 microseconds.

105. A network entity, comprising:
a transceiver circuitry;
a memory circuitry; and
a processor circuitry communicatively coupled to the transceiver circuitry and the memory circuitry, wherein the processor circuitry is configured to:
obtain a reference signal timing difference (RSTD) search window based on a positioning reference signal (PRS) configuration, wherein the RSTD search window is defined by an expected RSTD parameter and an RSTD uncertainty parameter, wherein the RSTD search window has an allowable range based on the PRS configuration, and wherein a different size of the RSTD search window is determined for each frequency range associated with the PRS configuration;
provide the RSTD search window to a user equipment (UE); and
transmit a plurality of PRS defined by the PRS configuration to the UE, wherein the plurality of PRS is transmitted in a subset of subcarriers that is less than all subcarriers over a given bandwidth.

106. A network entity, comprising:
means for obtaining a reference signal timing difference (RSTD) search window based on a positioning reference signal (PRS) configuration, wherein the RSTD search window is defined by an expected RSTD parameter and an RSTD uncertainty parameter, wherein the RSTD search window has an allowable range based on the PRS configuration, and wherein a different size of the RSTD search window is determined for each frequency range associated with the PRS configuration;
means for providing the RSTD search window to a user equipment (UE); and
means for transmitting a plurality of PRS defined by the PRS configuration to the UE, wherein the plurality of PRS is transmitted in a subset of subcarriers that is less than all subcarriers over a given bandwidth.

107. A non-transitory computer-readable medium storing computer-executable instructions for a network entity, the computer-executable instructions comprising:
one or more instructions instructing the network entity to obtain a reference signal timing difference (RSTD) search window based on a positioning reference signal (PRS) configuration, wherein the RSTD search window is defined by an expected RSTD parameter and an RSTD uncertainty parameter, and wherein the RSTD search window has an allowable range based on the PRS configuration, and wherein a different size of the RSTD search window is determined for each frequency range associated with the PRS configuration;
one or more instructions instructing the network entity to provide the RSTD search window to a user equipment (UE); and
one or more instructions instructing the network entity to transmit a plurality of PRS defined by the PRS configuration to the UE, wherein the plurality of PRS is transmitted in a subset of subcarriers that is less than all subcarriers over a given bandwidth.

108. A user equipment (UE), comprising:
a transceiver circuitry;
a memory circuitry; and
a processor circuitry communicatively coupled to the transceiver circuitry and the memory circuitry, wherein the processor circuitry is configured to:
receive a reference signal timing difference (RSTD) search window based on a positioning reference signal (PRS) configuration, wherein the RSTD search window is defined by an expected RSTD parameter and an RSTD uncertainty parameter, wherein the RSTD search window has an allowable range based on the PRS configuration, and wherein a different size of the RSTD search window is determined for each frequency range associated with the PRS configuration;
receive a plurality of PRS defined by the PRS configuration from a network node, wherein the plurality of PRS is transmitted in a subset of subcarriers that is less than all subcarriers over a given bandwidth; and
determine an RSTD between the network node and a reference node based on the RSTD search window.

109. A user equipment (UE), comprising:
means for receiving a reference signal timing difference (RSTD) search window based on a positioning reference signal (PRS) configuration, wherein the RSTD search window is defined by an expected RSTD parameter and an RSTD uncertainty parameter, wherein the RSTD search window has an allowable range based on the PRS configuration, and wherein a different size of the RSTD search window is determined for each frequency range associated with the PRS configuration;
means for receiving a plurality of PRS defined by the PRS configuration from a network node, wherein the plurality of PRS is transmitted in a subset of subcarriers that is less than all subcarriers over a given bandwidth; and
means for determining an RSTD between the network node and a reference node based on the RSTD search window.

110. A non-transitory computer-readable medium storing computer-executable instructions for a user equipment (UE), the computer-executable instructions comprising:
one or more instructions instructing the UE to receive a reference signal timing difference (RSTD) search window based on a positioning reference signal (PRS) configuration, wherein the RSTD search window is defined by an expected RSTD parameter and an RSTD uncertainty parameter, and wherein the RSTD search window has an allowable range based on the PRS configuration, and wherein a different size of the RSTD search window is determined for each frequency range associated with the PRS configuration;
one or more instructions instructing the UE to receive a plurality of PRS defined by the PRS configuration from a network node, wherein the plurality of PRS is transmitted in a subset of subcarriers that is less than all subcarriers over a given bandwidth; and
one or more instructions instructing the UE to determine an RSTD between the network node and a reference node based on the RSTD search window.

111. A location server, comprising:
a transceiver circuitry;
a memory circuitry; and
a processor circuitry communicatively coupled to the transceiver circuitry and the memory circuitry, wherein the processor circuitry is configured to:
determine a reference signal timing difference (RSTD) search window based on a positioning reference signal (PRS) configuration, wherein the RSTD search window is defined by an expected RSTD parameter and an RSTD uncertainty parameter, wherein the RSTD search window has an allowable range based on the PRS configuration, and wherein a different size of the RSTD search window is determined for each frequency range associated with the PRS configuration;
provide the RSTD search window to a user equipment (UE) via a base station serving the UE; and
configure a plurality of PRS defined by the PRS configuration to be transmitted to the UE, wherein the plurality of PRS is to be transmitted in a subset of subcarriers that is less than all subcarriers over a given bandwidth.

112. A location server, comprising:
means for determining a reference signal timing difference (RSTD) search window based on a positioning reference signal (PRS) configuration, wherein the RSTD search window is defined by an expected RSTD parameter and an RSTD uncertainty parameter, wherein the RSTD search window has an allowable range based on the PRS configuration, and wherein a different size of the RSTD search window is determined for each frequency range associated with the PRS configuration;
means for providing the RSTD search window to a user equipment (UE) via a base station serving the UE; and
means for configuring a plurality of PRS defined by the PRS configuration to be transmitted to the UE, wherein the plurality of PRS is to be transmitted in a subset of subcarriers that is less than all subcarriers over a given bandwidth.

113. A non-transitory computer-readable medium storing computer-executable instructions for a location server, the computer-executable instructions comprising:

one or more instructions instructing the location server to determine a reference signal timing difference (RSTD) search window based on a positioning reference signal (PRS) configuration, wherein the RSTD search window is defined by an expected RSTD parameter and an RSTD uncertainty parameter, wherein the RSTD search window has an allowable range based on the PRS configuration, and wherein a different size of the RSTD search window is determined for each frequency range associated with the PRS configuration;

one or more instructions instructing the location server to provide the RSTD search window to a user equipment (UE) via a base station serving the UE; and one or more instructions instructing the location server to configure a plurality of PRS defined by the PRS configuration to be transmitted to the UE, wherein the plurality of PRS is to be transmitted in a subset of subcarriers that is less than all subcarriers over a given bandwidth.

* * * * *